United States Patent
Lapalu

(10) Patent No.: US 11,332,606 B2
(45) Date of Patent: May 17, 2022

(54) CLEAR BINDER THAT IS SOLID WHEN COLD

(71) Applicant: TOTAL MARKETING SERVICES, Puteaux (FR)

(72) Inventor: Laurence Lapalu, Villeurbanne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 424 days.

(21) Appl. No.: 16/331,951

(22) PCT Filed: Sep. 5, 2017

(86) PCT No.: PCT/FR2017/052347
§ 371 (c)(1),
(2) Date: Mar. 8, 2019

(87) PCT Pub. No.: WO2018/046838
PCT Pub. Date: Mar. 15, 2018

(65) Prior Publication Data
US 2020/0157333 A1  May 21, 2020

(30) Foreign Application Priority Data

Sep. 8, 2016 (FR) .................................... 1658336

(51) Int. Cl.
| | |
|---|---|
| *C08L 25/10* | (2006.01) |
| *C08L 91/00* | (2006.01) |
| *C08K 3/013* | (2018.01) |
| *C08K 3/32* | (2006.01) |
| *C08J 3/12* | (2006.01) |
| *C08K 5/00* | (2006.01) |

(52) U.S. Cl.
CPC ............... *C08L 25/10* (2013.01); *C08J 3/12* (2013.01); *C08K 3/013* (2018.01); *C08K 3/32* (2013.01); *C08K 5/0016* (2013.01); *C08L 91/00* (2013.01); *C08K 2003/329* (2013.01)

(58) Field of Classification Search
CPC ......... C08L 25/10; C08L 91/00; C08K 3/013; C08K 3/32; C08K 5/0016; C08K 2003/329; C08J 3/12
USPC ....................................................... 524/575
See application file for complete search history.

(56) References Cited

U.S. PATENT DOCUMENTS

| | | | |
|---|---|---|---|
| 3,026,568 A | 3/1962 | Moar | |
| 4,279,579 A | 7/1981 | Froeschke | |
| 5,880,185 A | 3/1999 | Planche et al. | |
| 2003/0149138 A1 | 8/2003 | Lemoine et al. | |
| 2009/0163624 A1 | 6/2009 | De Sars | |
| 2011/0257318 A1 | 10/2011 | Neuville et al. | |
| 2011/0290695 A1 | 12/2011 | Thomas | |

FOREIGN PATENT DOCUMENTS

| | | | | |
|---|---|---|---|---|
| EP | 0199475 A1 | 10/1986 | | |
| EP | 0690102 A1 * | 1/1996 | ............... | C08L 95/00 |
| EP | 0690102 A1 | 1/1996 | | |
| EP | 1473327 A1 | 11/2004 | | |
| EP | 1783174 A1 | 5/2007 | | |
| FR | 2765229 A1 * | 12/1998 | ............... | C08L 95/00 |
| FR | 2765229 A1 | 12/1998 | | |
| WO | 0231083 A2 | 4/2002 | | |
| WO | 03012008 A2 | 2/2003 | | |
| WO | 2004/020532 A1 | 3/2004 | | |
| WO | 2007/128636 A2 | 11/2007 | | |
| WO | 2008/022836 A1 | 2/2008 | | |
| WO | 2008/043635 A1 | 4/2008 | | |
| WO | 2008/141930 A1 | 11/2008 | | |
| WO | 2008/141932 A1 | 11/2008 | | |
| WO | 2009/015969 A1 | 2/2009 | | |
| WO | 2009/071467 A1 | 6/2009 | | |
| WO | 2009/150519 A2 | 12/2009 | | |
| WO | 2009/153324 A1 | 12/2009 | | |
| WO | WO-2009150519 A2 * | 12/2009 | ............... | C08L 21/02 |
| WO | 2010/028261 A2 | 3/2010 | | |
| WO | 2011/000133 A1 | 1/2011 | | |
| WO | 2012/168380 A1 | 12/2012 | | |

OTHER PUBLICATIONS

Jan. 4, 2018 Written Opinion issued in International Patent Application No. PCT/FR2017/052347.
Lee et al. "Separation of solvent and deasphalted oil for solvent deasphalting process." Fuel Processing Technology, 2014, vol. 119, pp. 204-210.
Apr. 1, 2018 International Search Report issued in International Patent Application No. PCT/FR2017/052347.
Bernard Delmond. "Techniques de l'ingénieur," Résines naturelles, Doc. K340, pp. 1-12 (May 2002).

* cited by examiner

*Primary Examiner* — Kelechi C Egwim
(74) *Attorney, Agent, or Firm* — Oliff PLC

(57) ABSTRACT

A clear binder, in divided form, that is solid when cold, and to the different ways in which it is formed. Also, the method for transporting and/or storing and/or handling the binder, as well as to the uses of the binder for road and/or industrial applications.

12 Claims, No Drawings

CLEAR BINDER THAT IS SOLID WHEN COLD

TECHNICAL FIELD

The subject of the present invention is a clear binder that is solid under cold conditions and in divided form and to the different ways in which it is formed. The present invention also relates to the process for transporting and/or storing and/or handling said binder and also to the uses thereof for road and/or industrial applications.

TECHNICAL BACKGROUND

Conventional bituminous binders, due to the presence of asphaltenes, are black in color and are therefore difficult to color. Colored coatings are increasingly used because they make it possible, among other things, to improve the safety of road users by clearly identifying specific routes such as pedestrian routes, bicycle lanes and bus lanes. They also make it possible to materialize certain danger zones such as entrances to urban areas or dangerous bends. Colored coatings promote visibility in low light conditions, for example at night or in particular sites such as tunnels. Finally, they quite simply improve the esthetic appearance of urban roads and can be used for public squares, courtyards and schools, sidewalks, pedestrian streets, garden and park paths, parking areas and rest areas.

Consequently, for all the above-mentioned applications, it is preferred to use synthetic clear binders, which do not contain asphaltenes and can be colored.

Generally, the clear binder is stored and transported under hot conditions, in bulk, in tanker trucks or by boats at a high temperature of the order of 120° C. to 160° C. In point of fact, the storage and transportation of the clear binder under hot conditions has certain disadvantages. Firstly, the transportation of clear binder under hot conditions in the liquid form is considered to be dangerous and it is highly restricted from a regulatory viewpoint. This mode of transportation does not present particular difficulties when the transportation equipment and infrastructures are in good condition. If this is not the case, it can become problematic: if the tanker truck is not sufficiently lagged, the clear binder may become viscous during an excessively long trip. Clear binder delivery distances are therefore limited. Secondly, maintaining the clear binder at a high temperature in vessels or in tanker trucks consumes energy. In addition, maintaining the clear binder at temperature for a given period of time can affect the properties of the clear binder, in particular modification of the color of the clear binder and the aging properties, and thus change the final performance levels of the clear binder mix.

In order to overcome the problems of transporting and storing the clear binder under hot conditions, solutions for transporting and storing in packaging under cold conditions have been developed. This mode of transportation of the clear binder in packaging under cold conditions represents only a minimal fraction of the amounts transported throughout the world, but it corresponds to very real needs for geographic regions which are difficult and expensive to access using conventional transportation means.

By way of example, mention may be made of transporting the clear binder at ambient temperature in metal drums. This means is increasingly questionable from an environmental perspective since the cold clear binder stored in the drums must be reheated before it is used. However, this operation is difficult to carry out for this type of packaging and the drums constitute waste after use. Furthermore, the storage of the clear binder under cold conditions in drums results in losses since the clear binder is viscous and a part of the product remains on the walls of the drum when the clear binder is transferred into the tanks. With regard to the handling and the transportation of the clear binder in these drums, they can prove to be difficult and dangerous if specialized equipment for handling the drums is not available to the haulage contractors or at the site where the clear binder is used.

Document WO 2009/150519 discloses aqueous emulsions of synthetic clear binder comprising, on the one hand, a synthetic clear binder and, on the other hand, a latex.

Document FR 2 765 229 discloses clear binders and bituminous binders which can be in the form of pellets or granules.

Document EP 0 690 102 discloses organic hot melt binders, in particular based on clear binder, and also comprising a hydrocarbon wax.

There is therefore a need to find a solution for storage and transportation of clear binder under cold conditions making it possible to overcome the drawbacks mentioned above.

An objective of the invention is to provide an ecological and economic process for transporting and/or storing and/or handling the clear binder at ambient temperature, which makes it possible to avoid the use of additional means for maintaining said clear binder at temperature during the transportation and/or storage and/or handling and which makes it possible to minimize the presence of wastes and/or residues.

In particular, the aim of the present invention is to provide an improved process for transporting and/or storing the clear binder under cold conditions.

Another objective of the invention is to provide a process which allows the clear binder to be easily handled during handling operations.

Another objective of the present invention is to provide a clear binder which can be transported and/or stored and/or handled at ambient temperature, in particular at a high ambient temperature, the properties of which are preserved over time.

In particular, the objective of the present invention is to provide a clear binder which can be transported and/or stored for a period of time of greater than 2 months, preferably than 3 months, and at a high ambient temperature, in particular at a temperature of less than 100° C., preferably from 20° C. to 80° C.

Another objective of the invention is to provide a clear binder composition which can be easily handled, in particular at a high ambient temperature, especially at a temperature ranging up to 100° C., preferably from 20° C. to 80° C.

In particular, the aim of the present invention is to provide a clear binder which can be easily handled after a prolonged duration of transportation and/or of storage at a high ambient temperature, in particular for a duration of transportation and/or of storage of greater than 2 months, preferably of greater than 3 months, and at a temperature ranging up to 100° C., preferably between 20° C. and 80° C.

Another objective of the present invention is to provide a clear binder in a solid form at ambient temperature, so as to be able to handle it without loss of material. The task has been to provide a clear binder which is in a form which makes it possible to transport it, store it, and transfer it into an item of equipment, even at a high ambient temperature, without having to heat it and without loss of material. The clear binder provided is in a form which is divided and solid at ambient temperature, so that it makes it possible to satisfactorily solve the abovementioned problems. In addition, another objective of the invention is the provision of a clear binder in a form which makes it possible to transport it, store it and transfer it into an item of equipment, even at a high ambient temperature, without needing to heat it and without loss of material; it was also sought to provide a clear binder directly usable without further modification steps.

Another objective of the invention is to provide a clear binder kit that can be stored and/or transported under cold conditions.

Another objective is to provide an industrial and economical process for manufacturing clear binder which can be transported and/or stored at ambient temperature.

Another objective of the invention is to provide an industrial and economical process for manufacturing mixes from clear binder which can be transported and/or stored at ambient temperature.

SUMMARY

The invention relates to a clear binder that is solid under cold conditions and in divided form, comprising at least one clear binder base and at least one chemical additive chosen from an organic compound, a paraffin, a polyphosphoric acid and mixtures thereof.

The invention also relates to a process for preparing a clear binder, comprising:
  mixing at least one clear binder base and at least one chemical additive chosen from an organic compound, a paraffin, a polyphosphoric acid and mixtures thereof, to form an additivated clear binder,
  shaping the additivated clear binder in the form of a block or pellets.

According to one preferred embodiment, the clear binder comprises from 0.1% to 5% by weight, preferably from 0.5% to 4% by weight, more preferentially from 0.5% to 2.8% by weight, and even more preferentially from 0.5% to 2.5% by weight of said chemical additive relative to the total weight of said clear binder base.

According to a further preferred embodiment, the chemical additive is an organic compound which has a weight-average molar mass of less than or equal to 2000 g·mol$^{-1}$, preferably a molar mass of less than or equal to 1000 g·mol$^{-1}$.

According to one preferred embodiment, the clear binder comprises at least:
(i) one plasticizer,
(ii) one structuring agent, and
(iii) one copolymer,
(iv) one chemical additive chosen from an organic compound, a paraffin, a polyphosphoric acid and mixtures thereof.

According to one preferred embodiment, the clear binder is in the form of a block or pellets.

The invention also relates to a kit comprising at least:
  one clear binder that is solid under cold conditions and in divided form, as defined above and in detail below,
  one capsule comprising a compound chosen from at least one copolymer based on conjugated diene units and aromatic monovinyl hydrocarbon units, for example based on butadiene units and styrene units, at least one adhesion dopant, at least one coloring agent and a mixture thereof.

According to a preferred embodiment, the clear binder that is solid under cold conditions and in divided form is in the form of a block. According to one preferred embodiment, the clear binder that is solid under cold conditions and in divided form comprises, on one of its faces, a cavity for housing all or part of the capsule.

According to one preferred embodiment, the capsule is removably housed entirely or partially in said cavity.

The invention also relates to a process for transporting and/or storing and/or handling clear binder that is solid under cold conditions and in divided form, or a kit comprising such a clear binder, said clear binder being transported and/or stored and/or handled in the form of blocks or pellets of clear binder that are solid at a high ambient temperature.

According to one preferred embodiment, said clear binder or said kit is transported and/or stored and/or handled in the form of blocks or pellets of clear binder that are solid at a high ambient temperature.

The invention also relates to the use of clear binder that is solid under cold conditions and in divided form, or of a kit comprising such a clear binder, for manufacturing poured asphalts or mixes.

The invention also relates to a process for manufacturing poured asphalts or mixes comprising at least one clear binder and aggregates, the clear binder being chosen from clear binders that are solid under cold conditions and in divided form, this process comprising at least the steps of:
  heating the aggregates to a temperature ranging from 100° C. to 180° C.,
  mixing the aggregates with the clear binder in a vessel, such as a mixer or a drum mixer,
  obtaining poured asphalts or mixes.

According to one preferred embodiment, the process does not comprise a step of heating the clear binder that is solid under cold conditions and in divided form, before it is mixed with the aggregates.

The invention also relates to the use of clear binder that is solid under cold conditions and in divided form or of a kit comprising such a clear binder, for manufacturing emulsions.

DETAILED DESCRIPTION OF THE INVENTION

Clear Binder that is Solid Under Cold Conditions and in Divided Form

A subject of the invention relates to a clear binder that is solid under cold conditions and in divided form, comprising at least one clear binder base and at least one chemical additive chosen from an organic compound, a paraffin, a polyphosphoric acid and mixtures thereof.

According to one embodiment of the invention, the additivated clear binder comprises from 0.1% to 5% by weight, preferably from 0.5% to 4% by weight, more preferentially from 0.5% to 2.8% by weight, and even more preferentially from 0.5% to 2.5% by weight of said chemical additive relative to the total weight of said additivated clear binder.

The expression "clear binder that is solid under cold conditions and in divided form" means a clear binder that is solid at ambient temperature and that is packaged in a divided form, that is to say in the form of units which are distinct from one another, referred to as pellets or blocks.

The clear binder according to the invention is denoted without difference in the present description as "clear binder that is solid under cold conditions and in divided form" or "additivated clear binder".

The term "clear binder base" means compositions comprising at least one plasticizer, for example an oil of petroleum origin or of plant origin, at least one structuring agent, for example a hydrocarbon resin of petroleum origin or plant origin, at least one polymer and optionally at least one adhesion dopant.

The expression "of between X and Y" includes the limits. This expression thus means that the range targeted comprises the values X, Y and all the values ranging from X to Y.

The composition of the clear binder bases determines certain essential properties of these binders, in particular the plasticity index, the viscosity of the binder, or the color which must be as clear as possible.

Preferably, the clear binder is a composition that can be used as a substitute for bitumen-based binders for the preparation, for example, of a colored bitumen mix. A clear binder is free of asphaltenes and can therefore keep the natural color of the aggregate with which it is mixed or be easily colored with pigments.

According to one embodiment of the invention, the additivated clear binder is in the form of a block or pellets.

Another subject of the invention relates to a process for preparing a clear binder according to the invention, comprising:
mixing at least one clear binder base and at least one chemical additive chosen from an organic compound, a paraffin, a polyphosphoric acid and mixtures thereof, to give an additivated clear binder,
shaping the additived clear binder in the form of blocks or pellets.

According to a first particular embodiment, the mixing step is carried out by bringing into contact:
at least one clear binder base,
between 0.1% and 5% by weight, preferably between 0.5% and 4% by weight, more preferentially between 0.5% and 2.8% by weight, and even more preferentially between 0.5% and 2.5% by weight of the chemical additive(s) relative to the total weight of said clear binder base.

According to another particular embodiment, the mixing step is carried out by bringing into contact:
at least one clear binder base,
between 5% and 30% by weight, preferably between 6% and 28% by weight, more preferentially between 7% and 26% by weight of the chemical additive(s) relative to the total weight of said clear binder base.

For the purposes of the invention, when the clear binder that is solid under cold conditions and in divided form comprises between 5% and 30% by weight, preferably between 6% and 28% by weight, more preferentially between 7% and 26% by weight of chemical additive(s) relative to the total weight of the clear binder base, said clear binder may also be called "concentrated clear binder".

In the remainder of the description, the weight percentages are calculated relative to the total weight of the clear binder base.

Preferably, for the preparation of the clear binder that is solid under cold conditions and in divided form, the process is carried out at manufacturing temperatures of between 100° C. and 200° C., preferably between 140° C. and 200° C., more preferentially between 140° C. and 170° C., with stirring for a period of at least 10 minutes, preferably of between 30 minutes and 10 hours, more preferentially between 1 hour and 6 hours. By "manufacturing temperature" is meant the temperature at which the clear binder is heated before mixing with the chemical additive and also the temperature at which the clear binder and the chemical additive are mixed. The temperature and the duration of the heating vary according to the amount of clear binder used and are defined by the standard NF EN 12594.

According to one embodiment of the invention, the clear binder base comprises:
(i) a plasticizer, for example a natural or synthetic oil, free of asphaltenes,
(ii) a structuring agent, for example a hydrocarbon or plant resin,
(iii) a copolymer,
(iv) where appropriate, doping agents, or dopants, or adhesion dopants.

Clear binder compositions are described in the following patent applications and these clear binder compositions can be used as a clear binder base in the present invention.

A clear binder comprising hydrogenated white oils comprising at least 60% of paraffinic carbons (according to the ASTM D2140 method), and a hydrocarbon resin, where appropriate mixed with ethylene-vinyl acetate (EVA) copolymers or low density polyethylene, for example of the EPDM (ethylene-propylene-diene-monomer) type, as described in WO 01/53409, may be used as clear binder base.

A clear binder comprising an oil with a naphthenic content between 35% and 80% and a hydrocarbon resin as described in EP 1783174 may be used as clear binder base.

A clear binder comprising a synthetic oil, a resin and a SBS or SIS type polymer, as described in EP 1473327, may be used as clear binder base.

As clear binder base, use may be made of a clear binder comprising:
at least one oil of petroleum origin, preferably an aromatic oil comprising aromatic extracts of petroleum residues, obtained by extraction or dearomatization of residues from distillations of petroleum fractions, and
at least one resin of plant origin, preferably chosen from rosin esters, esters of glycerol and rosins, esters of pentaerythritol and rosins, taken alone or as a mixture, as described in WO 2009/150519.

As clear binder base, use may be made of a synthetic clear binder comprising:
at least one oil of plant origin, preferably chosen from rapeseed, sunflower, soybean, linseed, olive, palm, castor, wood, corn, pumpkin, grapeseed, jojoba, sesame, walnut, hazelnut, almond, shea, macadamia, cottonseed, alfalfa, rye, safflower, peanut, coconut and copra oils, and mixtures thereof.
at least one resin of petroleum origin, preferably chosen from resins of hydrocarbon petroleum origin resulting from the copolymerization of aromatic, aliphatic, cyclopentadienic petroleum fractions taken alone or as a mixture, and
at least one polymer, preferably chosen from styrene/butadiene copolymers, styrene/isoprene copolymers, ethylene/propene/diene terpolymers, polychloroprenes, ethylene/vinyl acetate copolymers, ethylene/methyl acrylate copolymers, ethylene/butyl acrylate copolymers, ethylene/methyl acrylate/glycidyl methacrylate terpolymers, ethylene/butyl acrylate/maleic anhydride terpolymers, atactic polypropylenes, taken alone or as mixtures, the amount of plant oil in the binder being greater than or equal to 10% by weight and the amount of polymer in the binder being less than or equal to 15% by weight, as described in WO 2010/055491.

According to another embodiment of the invention, the clear binder base comprises:
(i) a plasticizer consisting of an oil containing a total content of paraffinic compounds, measured according to the ASTM D2140 method, of at least 50%, preferably at least 60% by weight, more preferentially of between 50% and 90%, preferably between 60% and 80%, and (ii) a copolymer based on conjugated diene units and monovinyl aromatic hydrocarbon units, for example based on butadiene units and styrene units.

Preferably, the oil is a synthetic oil derived from deasphalting unit fractions (or "DAO oil").

Preferably, the oil contains a total content of paraffinic compounds greater than or equal to 50%, preferably greater than or equal to 60% by weight, and a total content of naphthenic compounds of less than or equal to 25% by weight, measured according to the ASTM D2140 method.

Preferably, the oil contains a total content of paraffinic compounds greater than or equal to 50%, preferably greater than or equal to 60% by weight, a total content of naphthenic compounds of less than or equal to 25% by weight, and a total content of aromatic compounds less than or equal to 25% by weight, measured according to the ASTM D2140 method.

For example, the oil contains a total content of paraffinic compounds, measured according to the ASTM D2140 method, of between 50% and 90%, preferably between 60% and 80% by weight, and a total content of naphthenic compounds of between 5% and 25% by weight, and a total content of aromatic compounds of between 5% and 25% by weight.

Preferably, the oil has an aniline point, measured according to the standard ISO2977: 1997, of greater than or equal to 80° C., preferably greater than or equal to 90° C., for example greater than 100° C.

Preferably, the clear binder base comprises (i) from 40% to 80% by weight of plasticizer, (ii) from 20% to 50% by weight of resin, (iii) from 1% to 7% by weight of copolymer; and (iv) optionally from 0.05% to 0.5% by weight of adhesion dopant, for example amine, relative to the weight of clear binder base.

Advantageously, the clear binder base comprises (i) from 40% to 80% by weight of plasticizer, (ii) from 20% to 50% by weight of resin, (iii) from 1% to 7% by weight of copolymer; and (iv) from 0.05% to 0.5% by weight of adhesion dopant, for example amine, relative to the weight of clear binder base.

Advantageously, the clear binder base also comprises (i) from 45% to 70% by weight of plasticizer, (ii) from 25% to 50% by weight of resin, (iii) from 1% to 7% by weight of copolymer; and (iv) optionally from 0.1% and 0.3% by weight of adhesion dopant, relative to the total weight of clear binder base.

Preferably, the clear binder base consists essentially of (i) from 40% to 80% by weight of plasticizer, (ii) from 20% to 50% by weight of resin, (iii) from 1% to 7% by weight of copolymer, relative to the total weight of clear binder base.

Advantageously, the clear binder base essentially consists of (i) from 40% to 80% by weight of plasticizer, (ii) from 20% to 50% by weight of resin, (iii) from 1% to 7% by weight of copolymer and (iv) from 0.05% to 0.5% by weight of adhesion dopant, relative to the total weight of clear binder base.

Advantageously, the clear binder base essentially also consists of (i) from 45% to 70% by weight of plasticizer, (ii) from 25% to 50% by weight of resin (iii) from 1% to 7% by weight of copolymer; and (iv) from 0.1% to 0.3% by weight of adhesion dopant, relative to the total weight of clear binder base.

Preferably, the copolymer is a copolymer based on styrene and butadiene units which comprises a weight content of 1,2-butadiene ranging from 5% to 70%.

Preferably, the copolymer is advantageously a copolymer based on styrene and butadiene units which comprises a weight content of 1,2-butadiene ranging from 5% to 70% and a weight content of 1,2-vinyl groups of between 10% and 40%.

For example, said copolymer based on styrene and butadiene units has a weight-average molecular weight of between 10 000 and 500 000, preferably between 50 000 and 200 000, and more preferentially between 50 000 and 150 000 daltons. Preferably, a styrene/butadiene block copolymer or styrene/butadiene/styrene block copolymer will be used.

The clear binders according to the invention are advantageously characterized in that they have a color index of less than or equal to 4, preferably less than or equal to 3, as determined according to the ASTM DH4 scale.

In addition, they may advantageously have a ring-and-ball softening temperature, determined according to the NF EN1427 standard, of between 55° C. and 90° C.

Preferably, the clear binder according to the invention has a penetrability at 25° C., measured according to the NF EN 1426 standard, of between 10 and 220$^{1}/_{10}$ mm, preferably between 30 and 100$^{1}/_{10}$ mm, more preferentially between 40 and 80$^{1}/_{10}$ mm. Those skilled in the art can modulate the penetrability of the clear binder of the invention in particular by judiciously choosing the [structuring agent/plasticizer] weight ratio in the composition of the clear binder base. Indeed, it is known that an increase in this ratio makes it possible to reduce the penetrability at 25° C.

The clear binder bases used in the invention can be prepared, for example, according to the following process comprising the steps of:

(i) mixing the plasticizer, for example the DAO oil, and heating at a temperature of between 140 and 200° C., for example for from 10 minutes to 30 minutes, (ii) adding the structuring agent, for example the hydrocarbon resin, mixing and heating at a temperature of between 140 and 200° C., for example for from 30 minutes to 2 hours, (iii) adding the polymer(s), for example SBS, mixing and heating at a temperature of between 140 and 200 C, for example for from 90 minutes to 3 hours, preferably from 90 minutes to 2 hours 30 minutes, (iv) optionally adding an adhesion dopant, mixing and heating at a temperature of between 140 and 200° C., for example for from 5 minute to 20 minutes.

The order of steps (i) to (iv) can be modified.

The Plasticizer

For the purposes of the invention, the term "plasticizer" means a chemical constituent for fluidizing and reducing the viscosity and the modulus of the binder obtained.

In one embodiment of the invention, the plasticizer is chosen from oils of petroleum origin, oils of plant origin and mixtures thereof.

In one preferred embodiment of the invention, the oils of plant origin are chosen from rapeseed, sunflower, soybean, linseed, olive, palm, castor, wood, corn, pumpkin, grapeseed, jojoba, sesame, walnut, hazelnut, almond, shea, macadamia, cottonseed, alfalfa, rye, safflower, peanut, coconut and copra oils, and mixtures thereof.

Preferably, the oils of plant origin are chosen from rapeseed, sunflower, linseed, coconut and soybean oils, and mixtures thereof.

In one preferred embodiment of the invention, the oils of petroleum origin are chosen from aromatic oils and oils of synthetic origin.

Preferably, the aromatic oils comprise aromatic extracts of petroleum residues, obtained by extraction or dearomatization of residues from distillations of petroleum fractions.

More preferably, the aromatic oils have a content of aromatic compounds of between 30% and 95% by weight, advantageously of between 50% and 90% by weight, more advantageously of between 60% and 85% by weight (SARA: Saturates/Aromatics/Resins/Asphaltenes method).

More preferably, the aromatic oils have a content of saturated compounds of between 1% and 20% by weight, advantageously of between 3% and 15% by weight, more advantageously of between 5% and 10% by weight (SARA: Saturates/Aromatics/Resins/Asphaltenes method).

More preferably, the aromatic oils have a content of resin-based compounds of between 1% and 10% by weight, advantageously of between 3% and 5% by weight (SARA: Saturates/Aromatics/Resins/Asphaltenes method).

In one preferred embodiment of the invention, the oils of synthetic origin result from the deasphalting fractions from the distillation under reduced pressure (vacuum residue VR) of crude oil (hereinafter denoted "DAO oil").

In particular, in one preferred embodiment, the plasticizer consists solely of a DAO oil.

The contents of paraffinic, naphthenic and aromatic compounds mentioned in the present patent application are determined according to the standard ASTM D2140, as % by weight relative to the weight of the oil.

In one specific embodiment, the plasticizer is an oil, for example a DAO oil, containing a total content of paraffinic compounds of at least 50% by weight, preferably of at least 60% by weight, for example of between 50% and 90%, preferably between 60% and 90%, more preferably between 50% and 80% and in particular of between 55% and 70% or in particular of between 60% and 75%.

In a more specific embodiment, the plasticizer is an oil, for example a DAO oil, additionally containing a total content of naphthenic compounds which does not exceed 25%, for example of between 5% and 25% and in particular of between 10% and 25%.

In a more specific embodiment, the plasticizer is an oil, for example a DAO oil, additionally containing a total content of aromatic compounds which does not exceed 25%, for example of between 5% and 25% and in particular of between 8% and 18%.

In one particularly preferred embodiment, the plasticizer is an oil, for example a DAO oil, comprising the respective contents:
(i) a total content of paraffinic compounds of between 50% and 90%;
(ii) a total content of naphthenic compounds of between 5% and 25%, for example between 15% and 25%; and
(iii) a total content of aromatic compounds of between 5% and 25%, for example between 10% and 15%.

In a more particularly preferred embodiment, the plasticizer is an oil, for example a DAO oil, comprising the respective contents:
(i) a total content of paraffinic compounds of between 60% and 75%;
(ii) a total content of naphthenic compounds of between 5% and 25%, for example between 15% and 25%; and
(iii) a total content of aromatic compounds of between 5% and 25%, for example between 10% and 15%.

Oils corresponding to the characteristics above and which can be used for the preparation of the clear binder according to the invention are obtained by the processes for the deasphalting of the vacuum residues (VRs) resulting from the refining of oil, for example by a deasphalting using a $C_3$ to $C_6$ solvent, preferably with propane. These deasphalting processes are well known to those skilled in the art and are described, for example, in Lee et al., 2014, Fuel Processing Technology, 119: 204-210. The residues resulting from the vacuum distillation (VRs) are separated according to their molecular weight in the presence of $C_3$ to $C_6$ solvent (for example propane). The "DAO" oil (deasphalted oil) thus obtained is rich in paraffin, exhibits a very low content of asphaltenes, has an evaporation temperature of between 440° C. and 750° C. and has a much greater API gravity than that of the vacuum residues The respective contents of paraffinic, naphthenic and aromatic compounds depend to a certain extent on the nature of the crude oil which is the source of the DAO oil and on the refining process used. Those skilled in the art know how to determine the respective contents of paraffinic, naphthenic and aromatic compounds of a DAO oil, for example using the SARA fractionation method, also described in Lee et al., 2014, Fuel Processing Technology, 119, 204-210, and to thus select the DAO oil appropriate for the preparation of the clear binder according to the invention.

In one embodiment, the amount of plasticizer used in the process for preparing the clear binder base is from 40% to 80%, preferably from 45% to 70% by weight, relative to the total weight of the clear binder base.

The Structuring Agent

The term "structuring agent" means any chemical component imparting mechanical properties and satisfactory cohesiveness to said binder.

The structuring agent used in the context of the invention is a resin, preferably chosen from resins of hydrocarbon petroleum origin or of plant origin.

According to one embodiment, the resins of plant origin are chosen from rosin esters such as rosin methyl esters, esters of glycerol and rosins, esters of pentaerythritol and rosins, and mixtures thereof.

According to one embodiment, the resins of plant origin are obtained from vegetables and/or plants. They can be harvest, that is to say harvested from the living plant. They can be used as they are, the term "natural resins" is then used, or they can be chemically converted, the term "modified natural resins" is then used.

Among the harvest resins are acaroid resins, dammar, natural rosins, modified rosins, rosin esters and metal resinates. These can be taken alone or as a mixture.

Among natural rosins, mention may be made of include gum and wood rosins, in particular pine rosin, and/or tall oil rosin. These natural rosins can be taken alone or as a mixture.

Among modified rosins, mention may be made of hydrogenated rosins, disproportionated rosins, polymerized rosins and/or maleinized rosins. These modified natural rosins can be taken alone or as a mixture, and can undergo one or more disproportionation, polymerization and/or maleinization treatments.

Among the rosin esters, mention may be made of methyl esters of natural rosins, methyl esters of hydrogenated rosins, esters of glycerol and of natural rosins, esters of glycerol and hydrogenated rosins, esters of glycerol and of disproportionated rosins, esters of glycerol and of polymerized rosins, esters of glycerol and of maleinized rosins, esters of pentaerythritol and of natural rosins and esters of pentaerythritol and of hydrogenated rosins. These rosin esters can be taken alone or as a mixture and come from rosins having undergone one or more disproportionation, polymerization and/or maleinization treatments.

Esters of pentaerythritol and natural rosins and esters of pentaerythritol and hydrogenated rosins are the preferred rosin esters.

Among the metal resinates, mention may be made of metal carboxylates, for example of Ca, Zn, Mg, Ba, Pb or Co, obtained from natural rosins or from modified rosins. Calcium resinates, zinc resinates, mixed calcium/zinc resinates, taken alone or as a mixture, are preferred.

For more information on resins of plant origin that can be used according to the invention, reference should be made to article K340 by Bernard Delmond published in "Techniques de l'ingénieur".

Preferably, the resins of plant origin have a softening temperature of between 60° C. and 200° C., preferably between 80° C. and 150° C., more preferably between 90° C. and 110° C.

Preferably, the resins of plant origin have an acid number of between 2 mg and 25 mg, preferably between 5 mg and 20 mg, more preferentially between 6 mg and 16 mg.

The resins of hydrocarbon petroleum origin are derived from the copolymerization of aromatic, aliphatic, cyclopentadienic petroleum fractions, taken alone or as a mixture, preferably derived from aromatic petroleum fractions. For example, it may be a polycycloaliphatic thermoplastic resin, for example of the low molecular weight hydrogenated cyclopentadiene homopolymer type.

More particularly, the hydrocarbon resin of the cyclopentane type has a softening temperature (or ring-and-ball temperature, RBT, according to the NF T 66-008 standard) of greater than 125° C., and a Gardner color index (according to the NF T 20-030 standard) equal to at most 1.

The weight ratio between the structuring agent and the plasticizer used for the preparation of the clear binder according to the invention is generally from 0.3 to 1.5, for example from 0.5 to 1.

In one specific embodiment, the amount of structuring agent used in the process for preparing the clear binder base is 25% to 50% by weight relative to the total weight of clear binder base.

The Polymer

The polymer used in the process for preparing the clear binder according to the invention is a copolymer based on conjugated diene units and monovinyl aromatic hydrocarbon units. The conjugated diene is preferably chosen from those comprising from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof.

The monovinyl aromatic hydrocarbon is preferably chosen from styrene, o-methyl styrene, p-methyl styrene, p-tert-butylstyrene, 2,3-dimethylstyrene, p-methylstyrene, vinyl naphthalene, vinyl toluene, vinyl xylene, and the like or mixtures thereof, in particular styrene.

More particularly, the polymer consists of one or more copolymers chosen from block copolymers of styrene and butadiene, of styrene and isoprene, of styrene and chloroprene, of styrene and carboxylated butadiene or else of styrene and carboxylated isoprene. A preferred copolymer is a copolymer based on butadiene units and styrene units such as the SB styrene/butadiene block copolymer or the SBS styrene/butadiene/styrene block copolymer.

The styrene/conjugated diene copolymer, in particular the styrene/butadiene copolymer, advantageously has a weight content of styrene ranging from 5% to 50%, preferably from 20% to 50%.

The styrene/conjugated diene copolymer, in particular the styrene/butadiene copolymer, advantageously has a weight content of butadiene (1,2- and 1,4-) ranging from 50% to 95%. The styrene/conjugated diene copolymer, in particular the styrene/butadiene copolymer, advantageously has a content by weight of 1,2-butadiene ranging from 5% to 70%, preferably from 5% to 50%. The 1,2-butadiene units are the units which result from polymerization via the 1,2 addition of butadiene units.

The weight-average molecular weight of the styrene/conjugated diene copolymer, and in particular that of the styrene/butadiene copolymer, may be, for example, between 10 000 and 500 000, preferably between 50 000 and 200 000 and more preferentially from 50 000 to 150 000 daltons.

In one specific embodiment, the clear binder does not comprise polymer of the ethylene-vinyl acetate (EVA) type or of the low density polyethylene type, such as EPDM (ethylene-propylene-diene monomer) or EPM (ethylene-propylene monomer).

In one specific embodiment, the total amount of polymer used in the process of the invention is from 0.5% to 20% by weight, preferably from 1% to 10%, preferably from 1% to 7% by weight, for example from 2% to 5%, relative to the total weight of clear binder base.

The Adhesion Dopants

In order to improve the mutual affinity between the binder and the aggregates and to ensure their durability, adhesion dopants may also be used. These are, for example, nitrogen-containing surfactant compounds derived from fatty acids (amines, polyamines, alkylpolyamine, etc.).

When added to the clear binder, the adhesion dopants generally represent between 0.05% and 0.5% by weight relative to the weight of clear binder. For example, in one specific embodiment, 0.05% to 0.5% of amine, preferably 0.1% to 0.3% of amine, relative to the total weight of clear binder base, will be added.

The Coloring Agents

The synthetic clear binder may also include one or more coloring agents, such as mineral pigments or organic dyes. The pigments are selected according to the shade and the color desired for the coating. For example, metal oxides such as iron oxides, chromium oxides, cobalt oxides or titanium oxides will be used to obtain the colors red, yellow, gray, blue-green or white. The pigments can be added either to the clear binder or to the mix (mixture with the aggregates for example) or to an emulsion of the clear binder.

The Chemical Additive

The clear binder according to the invention comprises at least one chemical additive chosen from: an organic compound, a paraffin, a polyphosphoric acid and mixtures thereof.

In particular, the clear binder that is solid and in divided form comprises at least one chemical additive in an amount suitable for its penetrability to be preferably from 5 to 50 $^1/_{10}$ mm, and/or for the ring-and-ball softening temperature (RBT) to be preferably greater than or equal to 60° C., it being understood that the penetrability is measured at 25° C. according to the EN 1426 standard and the RBT is measured according to the EN 1427 standard.

In one embodiment of the invention, the chemical additive is an organic compound. Advantageously, the organic compound exhibits a molar mass of less than or equal to 2000 g·mol$^{-1}$, preferably a molar mass of less than or equal to 1000 g·mol$^{-1}$.

In this first embodiment, according to a first alternative form, the organic compound is a compound of general formula (I):

Ar1-R-Ar2    (I), in which:
  Ar1 and Ar2 represent, independently of one another, a benzene nucleus or a system of condensed aromatic nuclei of 6 to 20 carbon atoms which are substituted by at least one hydroxyl group and
  R represents an optionally substituted divalent radical, the main chain of which comprises from 6 to 20 carbon atoms and at least one group chosen from the amide, ester, hydrazide, urea, carbamate and anhydride functions.

Preferably, Ar1 and/or Ar2 are substituted by at least one alkyl group of 1 to 10 carbon atoms, advantageously in one or more ortho positions with respect to the hydroxyl group(s); more preferably, Ar1 and Ar2 are 3,5-dialkyl-4-hydroxyphenyl groups, advantageously 3,5-di(tert-butyl)-4-hydroxyphenyl groups.

Preferably, R is in the para position with respect to a hydroxyl group of Ar1 and/or Ar2.

Advantageously, the compound of formula (I) is 2',3-bis[(3-[3,5-di-tert-butyl-4-hydroxyphenyl]propionyl)]propionohydrazide.

According to a second alternative form of this first embodiment, the organic compound is a compound of general formula (II):

R—(NH)$_n$CONH—(X)$_m$—NHCO(NH)$_n$—R'    (II), in which:
  the R and R' groups, which may be identical or different, contain a saturated or unsaturated, linear, branched or cyclic hydrocarbon-based chain comprising from 1 to 22 carbon atoms, which is optionally substituted, and which optionally comprises heteroatoms, rings and/or heterocycles;
  the X group contains a saturated or unsaturated, linear, cyclic or branched hydrocarbon-based chain comprising from 1 to 22 carbon atoms, which is optionally substituted and which optionally comprises heteroatoms, rings and/or heterocycles;
  n and m are integers having a value of 0 or 1, independently of one another.

According to this alternative form, when the integer m has a value of 0, then the R—(NH)$_n$CONH and NHCO(NH)$_n$—' groups are covalently bonded by a hydrazide CONH—NHCO bond. The R group or the R' group then comprises at least one group chosen from: a hydrocarbon-based chain of at least 4 carbon atoms, an aliphatic ring of 3 to 8 atoms and a condensed aliphatic, partially aromatic or completely aromatic polycyclic system, each ring comprising 5 or 6 atoms.

Still according to this alternative form, when the integer m has a value of 1, then the R group, the R' group and/or the X group comprises at least one group chosen from: a hydrocarbon-based chain of at least 4 carbon atoms, an aliphatic ring of 3 to 8 atoms and a condensed aliphatic, partially aromatic or completely aromatic polycyclic system, each ring comprising 5 or 6 atoms.

Preferably, the R and/or R' group comprises an aliphatic hydrocarbon-based chain of 4 to 22 carbon atoms, in particular, chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the X group represents a saturated linear hydrocarbon-based chain comprising from 1 to 22 carbon atoms. Preferably, the X group is chosen from the C2H4 and C3H6 groups.

Preferably, the X group can also be a cyclohexyl group or a phenyl group; the R—(NH)$_n$CONH— and NHCO(NH)$_n$—R' radicals can then be in the ortho, meta or para position. Moreover, the R—(NH)$_n$CONH— and NHCO(NH)$_n$—R' radicals can be in the cis or trans position with respect to one another. Furthermore, when the X radical is cyclic, this ring can be substituted by other groups than the two main groups R—(NH)$_n$CONH— and —NHCO(NH)$_n$—R'.

Preferably, the X group comprises two rings of 6 carbons which are connected by a $CH_2$ group, these rings being aliphatic or aromatic. In this case, the X group is a group comprising two aliphatic rings connected by an optionally substituted $CH_2$ group, for example:

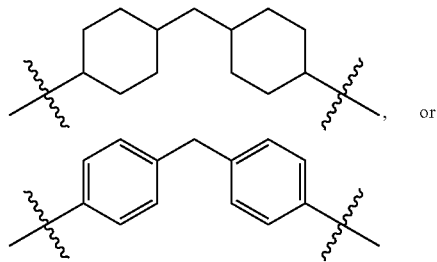

, or

Advantageously, according to this alternative form, the organic compound is a compound of general formula (II) chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(stearamide) of formula $C_{17}H_{35}$—CONH—$CH_2$—$CH_2$—NHCO—$C_{17}H_{35}$; and ureide derivatives such as 4,4'-bis(dodecylaminocarbonylamino)diphenylmethane of formula $C_{12}H_{25}$—NHCONH—$C_6H_4$—$CH_2$—$C_6H_4$—NHCONH—$C_{12}H_{25}$.

Preferably, the compound of general formula (II) is chosen from those which satisfy the condition n=0.

Preferably, the compound of general formula (II) is chosen from those which satisfy the condition: the sum of the numbers of the carbon atoms of R, X and R' is greater than or equal to 10, advantageously greater than or equal to 14, preferably greater than or equal to 18.

Preferably, the compound of general formula (II) is chosen from those which satisfy the condition: the number of the carbon atoms of at least one of R and R' is greater than or equal to 10, advantageously greater than or equal to 12, preferably greater than or equal to 14.

Preferably, according to a first alternative form, the compound of general formula (II) is chosen from those of formula (IIA):

R—CONH—(X)$_m$—NHCO—R'    (IIA)

in which R, R', m and X have the same definitions as above.

Preferably, in the formula (IIA), when m=1, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from the $C_2H_4$ and $C_3H_6$ groups.

Preferably, the compound of general formula (IIA) is chosen from those which satisfy the condition: the sum of the numbers of the carbon atoms of R, X and R' is greater than or equal to 10, advantageously greater than or equal to 14, preferably greater than or equal to 18.

Preferably, the compound of general formula (IIA) is chosen from those which satisfy the condition: the number of the carbon atoms of at least one of R and R' is greater than or equal to 10, advantageously greater than or equal to 12, preferably greater than or equal to 14.

More preferentially, according to this alternative form, the compound of general formula (IIA) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second alternative form, the compound of general formula (II) is chosen from those of formula (IIB):

R—CONH—R'    (IIB)

in which R and R' have the same definitions as above.

Advantageously, according to this alternative form, the sum of the numbers of the carbon atoms of R and R' is greater than or equal to 10, advantageously greater than or equal to 14, preferably greater than or equal to 18.

More advantageously still, according to this alternative form, the number of the carbon atoms of R is greater than or equal to 10, advantageously greater than or equal to 12, preferably greater than or equal to 14, and R'=H.

Advantageously, the compound of general formula (II) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

More advantageously still, the compound of general formula (II) is N,N'-ethylenedi(stearamide) of formula $C_{17}H_{35}$—CONH—$CH_2$—$CH_2$—NHCO—$C_{17}H_{35}$.

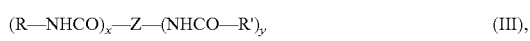

Preferably, when the chemical additive is chosen from the organic compounds of formula (II), it is used in combination with at least one other chemical additive chosen from the organic compounds of formulae (I), (III), (V), (VI) and (VII) and/or the reaction products of at least one $C_3$-$C_{12}$ polyol and of at least one $C_2$-$C_{12}$ aldehyde, in particular those comprising a group of formula (IV).

According to a third alternative form of this embodiment, the organic compound is a compound of formula (III):

$$(R—NHCO)_x—Z—(NHCO—R')_y \quad (III),$$

in which:

R and R', which may be identical or different, contain a saturated or unsaturated, linear, branched or cyclic hydrocarbon-based chain comprising from 1 to 22 carbon atoms, which is optionally substituted, and which optionally comprises heteroatoms, rings and/or heterocycles;

Z represents a trifunctionalized group chosen from the following groups:

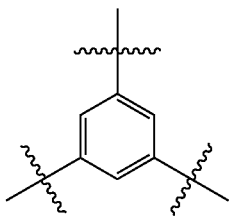

$Z_1$

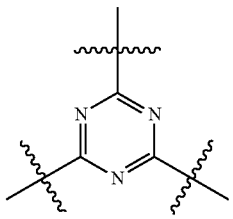

$Z_2$

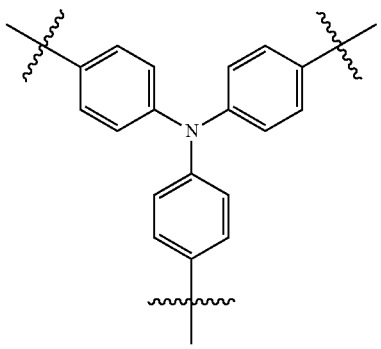

$Z_3$ x and y are integers different in value varying from 0 to 3 and such that x+y=3.

Preferably, when x is equal to 0 and Z represents $Z_2$, the compound of formula (III) is N2,N4,N6-tridecylmelamine having the following formula, with R' representing the $C_9H_{19}$ group:

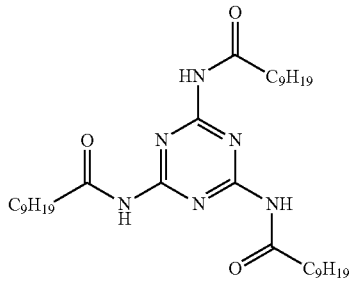

Other preferred compounds corresponding to the formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to the formula (III) are such that: y is equal to 0 and Z represents $Z_1$; the compounds then have the formula:

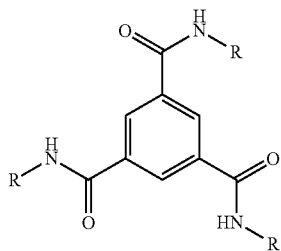

with R chosen from the following groups, taken alone or as mixtures:

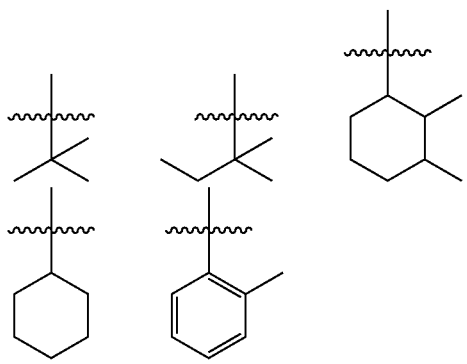

Other preferred compounds corresponding to the formula (III) are such that: y is equal to 0, Z represents Z1 and R represents a saturated linear hydrocarbon-based chain of 1 to 22 carbon atoms, preferably of 8 to 12 carbon atoms.

According to a fourth alternative form of this embodiment, the organic compound is a reaction product of at least one $C_3$-$C_{12}$ polyol and of at least one $C_2$-$C_{12}$ aldehyde. Mention may be made, among the polyols which can be used, of sorbitol, xylitol, mannitol and/or ribitol. Preferably, the polyol is sorbitol.

Advantageously, according to this alternative form, the organic compound is a compound which comprises at least one function of general formula (IV):

wherein:
x is an integer,
R is chosen from a $C_1$-$C_{11}$ aralkyl, aryl, alkenyl or alkyl radical, optionally substituted with one or more halogen atoms, or one or more $C_1$-$C_6$ alkoxy groups.

The organic compound is advantageously a sorbitol derivative. The term "sorbitol derivative" is understood to mean any reaction product obtained from sorbitol, in particular any reaction product obtained by reacting an aldehyde with D-sorbitol. Sorbitol acetals, which are sorbitol derivatives, are obtained by this condensation reaction. 1,3:2,4-Di-O-benzylidene-D-sorbitol is obtained by reacting 1 mol of D-sorbitol and 2 mol of benzaldehyde and has the formula:

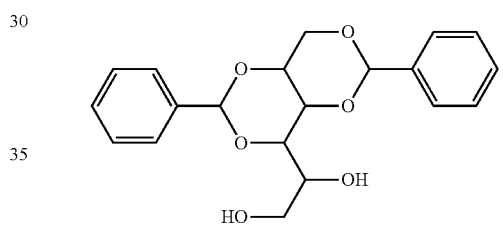

The sorbitol derivatives can thus be all the condensation products of aldehydes, in particular of aromatic aldehydes, with sorbitol. Sorbitol derivatives will then be obtained of general formula:

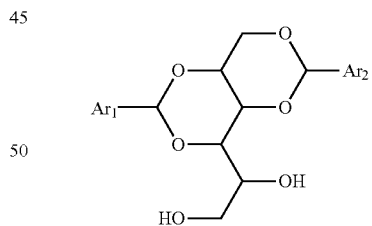

where $Ar_1$ and $Ar_2$ are optionally substituted aromatic nuclei.

The sorbitol derivatives, other than 1,3:2,4-di-O-benzylidene-D-sorbitol, can include, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene) sorbitol, 1,3:2,4-bis(p-butylbenzylidene)sorbitol, 1,3:2,4-bis (p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4- methylbenzylidene)-D-sorbitol and 1,3:2,4-di-O-(4,3-dimethylbenzylidene)-D-sorbitol. Preferably, according to this alternative form, the organic compound is 1,3:2,4-di-O-benzylidene-D-sorbitol.

According to a fifth alternative form of this embodiment, the organic compound is a compound of general formula (V):

$$R''\text{—}(COOH)_z \qquad (V),$$

in which R" represents a linear or branched and saturated or unsaturated chain comprising from 4 to 68 carbon atoms, preferably from 4 to 54 carbon atoms, more preferably from 4 to 36 carbon atoms, and z is an integer varying from 2 to 4.

Preferably, the R" group is preferably a saturated linear chain of formula $C_wH_{2w}$, with w being an integer varying from 4 to 22, preferably from 4 to 12.

According to this alternative form of the invention, the organic compounds corresponding to the formula (V) can be diacids (z=2), triacids (z=3) or tetracids (z=4). The preferred organic compounds according to this alternative form are diacids with z=2.

Preferably, according to this alternative form, the diacids have the general formula $HOOC\text{—}C_wH_{2w}\text{—}COOH$ with w being an integer varying from 4 to 22, preferably from 4 to 12 and where z=2, and $R''=C_wH_{2w}$.

Advantageously, according to this alternative form, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

More advantageously, the organic compound is sebacic acid or 1,10-decanedioic acid with w=8.

The diacids can also be diacid dimers of unsaturated fatty acid(s), that is to say dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels-Alder reaction, for example).

Preferably, a single type of unsaturated fatty acid is dimerized. They are derived in particular from the dimerization of an unsaturated fatty acid, in particular a $C_8$ to $C_{34}$, in particular $C_{12}$ to $C_{22}$, especially $C_{16}$ to $C_{20}$ and more particularly $C_{18}$ unsaturated fatty acid. A preferred fatty acid dimer is obtained by dimerization of linoleic acid, it being possible for the dimer to be subsequently partially or completely hydrogenated.

Another preferred fatty acid dimer has the formula $HOOC\text{—}(CH_2)_7\text{—}CH\text{=}CH\text{—}(CH_2)_7\text{—}COOH$. Another preferred fatty acid dimer is obtained by dimerization of methyl linoleate. In the same way, it is possible to find triacids of fatty acids and tetracids of fatty acids, obtained respectively by trimerization and tetramerization of at least one fatty acid.

According to a sixth alternative form of this embodiment, the organic compound is a compound of general formula (VI):

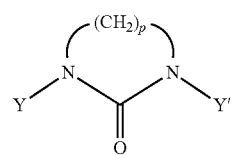

in which:

the Y and Y' groups represent, independently of one another, an atom or group chosen from: H, $-(CH_2)_q-CH_3$, $-(CH_2)_q-NH_2$, $-(CH_2)_q-OH$, $-(CH_2)_q-COOH$ or

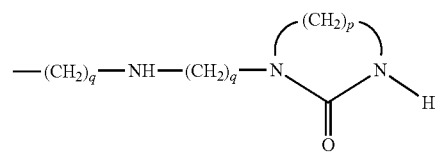

with q being an integer varying from 2 to 18, preferably from 2 to 10, preferably from 2 to 4, and p being an integer of greater than or equal to 2, preferably having a value of 2 or 3.

Mention may be made, among the preferred organic compounds corresponding to the formula (VI), of the following compounds:

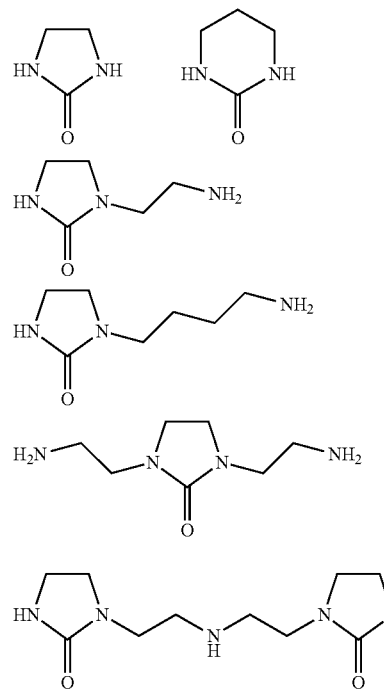

Preferably, according to this alternative form, the organic compound of general formula (VI) is:

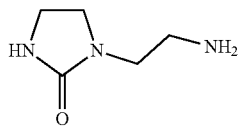

According to a seventh alternative form of this embodiment, the organic compound is a compound of general formula (VII):

R—NH—CO—CO—NH—R'  (VII)

in which R and R', which may be identical or different, represent a saturated or unsaturated, linear, branched or cyclic hydrocarbon-based chain comprising from 1 to 22 carbon atoms, preferably from 8 to 12 carbon atoms, which is optionally substituted, and which optionally comprises heteroatoms, rings and/or heterocycles.

According to another embodiment of the invention, the chemical additive is a paraffin. The paraffins have chain lengths of 30 to 120 carbon atoms ($C_{30}$ to $C_{120}$). The paraffins are advantageously chosen from polyalkylenes.

Preferably, polymethylene paraffins and polyethylene paraffins will be used according to the invention. These paraffins may be of petroleum origin or come from the chemical industry.

Advantageously, the paraffins used are synthetic paraffins resulting from the conversion of biomass and/or of natural gas.

Preferably, these paraffins contain a large proportion of "normal" paraffins, that is straight-chain, unbranched linear paraffins (saturated hydrocarbons). Thus, the paraffins may comprise from 50% to 100% of normal paraffins and from 0 to 50% of isoparaffins and/or of branched paraffins. More preferentially, the paraffins comprise from 85% to 95% of normal paraffins and from 5% to 15% of isoparaffins and/or of branched paraffins. Advantageously, the paraffins comprise from 50% to 100% of normal paraffins and from 0 to 50% of isoparaffins. Even more advantageously, the paraffins comprise from 85% to 95% of normal paraffins and from 5% to 15% of isoparaffins.

Preferably, the paraffins are polymethylene paraffins. More particularly, the paraffins are synthetic polymethylene paraffins, for example paraffins resulting from the conversion of syngas by the Fischer-Tropsch process. In the Fischer-Tropsch process, paraffins are obtained by reaction of hydrogen with carbon monoxide on a metal catalyst. Fischer-Tropsch synthesis processes are described for example in the publications EP 1 432 778, EP 1 328 607 or EP 0 199 475.

According to another embodiment of the invention, the chemical additive is a polyphosphoric acid. The polyphosphoric acids (PPAs) that can be used in the invention are described in WO 97/14753. These are compounds of empirical formula PqHrOs in which q, r and s are positive numbers such that:
q≥2 and in particular q is from 3 to 20 or more and that 5q+r−2s=0.

In particular, said polyphosphoric acids can be linear compounds of empirical formula $P_qH_{(q+2)}O_{(3q+1)}$ corresponding to the structural formula:

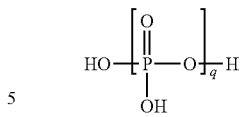

where q has the definition given above. They can also be products of two-dimensional or three-dimensional structure.

All these polyphosphoric acids can be considered as products of polycondensation by heating aqueous metaphosphoric acid.

It will not be a departure from the framework of the invention to combine several different chemical additives, such as different organic compounds of formulae (I), (II), (III), (V), (VI) and (VII), the reaction products of at least one $C_3$-$C_{12}$ polyol and of at least one $C_2$-$C_{12}$ aldehyde, in particular those comprising a group of formula (IV), and/or various paraffins and/or various polyphosphoric acids in the clear binder.

According to one advantageous embodiment, the clear binder according to the invention comprises at least two chemical additives.

According to a first alternative form of this embodiment, the clear binder according to the invention comprises at least one first chemical additive of formula (V) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, in particular those comprising a group of formula (IV), the second chemical additive being distinct from the first chemical additive.

Preferably, and according to this first alternative form, the clear binder according to the invention comprises at least one first chemical additive of formula (V) and at least one second chemical additive of formula (II).

More preferentially, and according to this first alternative form, the clear binder according to the invention comprises at least one first additive of formula (V) and at least one second chemical additive of formula (IIA).

Preferably, and still according to this first alternative form, the first chemical additive of formula (V) is chosen from diacids (z=2), triacids (z=3) and tetracids (z=4), preferably from diacids (z=2).

More preferentially, and still according to this first alternative form, the first chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first alternative form, the first chemical additive of formula (V) is sebacic acid or 1,10-decanedioic acid with w=8.

According to a second alternative form of this embodiment, the clear binder according to the invention comprises at least one first chemical additive of formula (II) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, in particular those comprising a group of formula (IV), the second chemical additive being distinct from the first chemical additive.

Preferably, and according to this second alternative form, the first chemical additive of formula (II) is chosen from the chemical additives of formula (IIA).

More preferentially, and according to this second alternative form, the clear binder according to the invention comprises at least one first chemical additive of formula (IIA) and at least one second chemical additive chosen from: the chemical additives of formula (I); the chemical additives of formula (IIB); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, in particular those comprising a group of formula (IV), the second chemical additive being distinct from the first chemical additive.

Even more preferably, and according to this second alternative form, the clear binder according to the invention comprises at least one first additive of formula (IIA) and at least one second additive of formula (V).

Advantageously, and according to this second alternative form, the first chemical additive of formula (IIA) is N,N'-ethylenedi(stearamide).

Preferably, and according to this second alternative form, the second additive of formula (V) is chosen from diacids (z=2), triacids (z=3) and tetracids (z=4), preferably from diacids (z=2).

Even more preferentially, and still according to this second alternative form, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

According to a third alternative form of this embodiment, the clear binder comprises at least sebacic acid or 1,10-decanedioic acid and at least N,N'-ethylenedi(stearamide).

According to a fourth alternative form of this embodiment, the clear binder according to the invention comprises at least one first additive of formula (I) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, in particular those comprising a group of formula (IV), the second chemical additive being distinct from the first chemical additive.

Preferably, and according to this fourth alternative form, the second chemical additive is chosen from the chemical additives of formula (II) and the chemical additives of formula (V).

Preferably, and according to this fourth alternative form, the second chemical additive of formula (II) is chosen from the chemical additives of formula (IIA).

More preferentially, and according to this fourth alternative form, the second chemical additive of formula (II) is N,N'-ethylenedi(stearamide).

Preferably, and still according to this fourth alternative form, the second chemical additive of formula (V) is chosen from diacids (z=2), triacids (z=3) and tetracids (z=4), preferably from diacids (z=2).

Even more preferentially, and still according to this fourth alternative form, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and still according to this fourth alternative form, the second chemical additive of formula (V) is sebacic acid or 1,10-decanedioic acid.

Preferably, and according to this fourth alternative form, the first chemical additive of formula (I) is 2',3-bis[(3-[3,5-di-tert-butyl-4-hydroxyphenyl]propionyl)]propionohydrazide.

Preferably, and according to this embodiment, the weight ratio of the first chemical additive with respect to the second chemical additive is from 1:99 to 99:1, preferably from 1:9 to 9:1, even more preferentially from 1:5 to 5:1.

According to a first embodiment of the invention, the additivated clear binder comprises from 0.1% to 10% by weight, preferably from 0.5% to 5% by weight, more preferentially from 0.5% to 2.8% by weight, and even more preferentially from 0.5% to 2.5% by weight of chemical additive relative to the total weight of the binder base.

According to another embodiment of the invention, the additivated clear binder according to the invention is a concentrated clear binder. In this case, before its use, for example in an application described below, said binder is melted and then diluted with at least one other non-additivated clear binder. This dilution is calculated to achieve an additive content of from 0.1% to 10% by weight, preferably from 0.5% to 5% by weight, more preferentially from 0.5% to 2.8% by weight, and even more preferentially from 0.5% to 2.5% by weight of chemical additive relative to the total weight of the binder base.

According to this embodiment, the concentrated clear binder comprises from 5% to 30% by weight, preferably from 6% to 28% by weight, more preferentially from 7% to 26% by weight of the chemical additive relative to the total weight of said binder base.

According to one embodiment of the invention, the additivated clear binder may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from random or block, preferably random, terpolymers of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

(c) The copolymers result from the grafting of a monomer B, chosen from glycidyl acrylate and glycidyl methacrylate, to a polymer substrate. The polymer substrate consists of a polymer chosen from polyethylenes, in particular low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by weight, preferably from 50% to 99% by weight, of ethylene. Said grafted copolymers comprise from 0.5% to 15% by weight, preferably from 2.5% to 15% by weight, of grafted units resulting from the monomer B.

Advantageously, the olefinic polymer adjuvant is chosen from random terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

According to one embodiment of the invention, the clear binder comprises from 0.05% to 15% by weight, preferably from 0.1% 10% by weight, more preferentially from 0.5% to 6% by weight of the olefinic polymer adjuvant relative to the total weight of said binder.

According to one particular embodiment, a clear binder that is solid under cold conditions and in divided form is prepared by bringing into contact:
at least one clear binder base as defined above,
from 0.1% to 5% by weight, preferably from 0.5% to 4% by weight, more preferentially from 0.5% to 2.8% by weight, and even more preferentially from 0.5% to 2.5% by weight of at least one chemical additive chosen from an organic compound, a paraffin, a polyphosphoric acid and mixtures thereof,
and from 0.05% to 15% by weight, preferably from 0.1% to 10% by weight, more preferentially from 0.5% to 6% by weight of an olefinic polymer adjuvant,
the percentages being given by weight relative to the total weight of the clear binder base.

According to another particular embodiment, a clear binder that is solid under cold conditions and in divided form is prepared by bringing into contact:
at least one clear binder base as defined above,
from 5% to 30% by weight, preferably from 6% to 28% by weight, more preferentially from 7% to 26% by weight of at least one chemical additive chosen from an organic compound, a paraffin, a polyphosphoric acid and mixtures thereof,
and from 0.05% to 15% by weight, preferably from 0.1% to 10% by weight, more preferably from 0.5% to 6% by weight of an olefinic polymer adjuvant,
the percentages being given by weight relative to the total weight of the clear binder base.

The amounts of chemical additive(s) and, optionally, of olefinic polymer adjuvant are adjusted according to the nature of the clear binder base used. In particular, the target penetrability is preferably from 5 to 50 1/10 mm and the target ring-and-ball softening temperature (RBT) is preferably greater than or equal to 60° C., it being understood that the penetrability is measured at 25° C. according to the EN 1426 standard and the RBT is measured according to the EN 1427 standard.

Process for Transporting and/or Storing and/or Handling Clear Binder that is Solid Under Cold Conditions and in Divided Form Another subject of the invention relates to a process for transporting and/or storing and/or handling clear binder that is solid under cold conditions and in divided form, said clear binder being transported and/or stored and/or handled in the form of blocks or pellets of clear binder that are solid at a high ambient temperature. The clear binder that is solid under cold conditions and in divided form is as described above.

Preferably, the additivated clear binder of the invention is transported and/or stored at a high ambient temperature for a period of greater than or equal to 2 months, preferably greater than or equal to 3 months.

According to one embodiment of the invention, the additivated clear binder of the invention is transported and/or stored at a temperature below 100° C. In particular, the transportation and/or storage temperature corresponds to ambient temperature. By ambient temperature is meant the temperature which is reached during the transportation and/or storage of the clear binder according to the invention without said clear binder being heated by any type of process. Thus, the ambient temperature can reach high temperatures, below 100° C. during summer periods, in particular in geographical regions with a hot climate.

Preferably, the high ambient temperature is below 100° C.

Advantageously, the high ambient temperature is from 20° C. to 90° C., preferably from 20° C. to 80° C., more preferably from 40° C. to 80° C., more preferably still from 40° C. to 60° C.

The clear binders that are solid under cold conditions and in divided form, of the present invention, are notable in that they allow the transportation and/or storage of cold clear binder cold under optimal conditions, in particular without creep of said solid clear binders during transportation and/or storage thereof, even when the ambient temperature is high and without the properties of said clear binder being degraded, or even with them being improved.

Clear Binder Block

According to one embodiment of the invention, the clear binder that is solid under cold conditions, as described above, is in the form of a block.

The term "clear binder block" means a block of clear binder having a weight of between 0.1 kg and 1000 kg, preferably between 1 kg and 200 kg, more preferentially between 1 kg and 50 kg, even more preferentially between 5 kg and 25 kg, even more preferentially between 10 kg and 30 kg, said block being advantageously parallelepipedal, preferably being a like a paving stone.

The clear binder block preferably has a volume of between 100 cm$^3$ and 50 000 cm$^3$, preferably between 5000 cm³ and 25 000 cm³, more preferentially between 10 000 cm³ and 30 000 cm³, even more preferentially between 14 000 cm³ and 25 000 cm³.

When the clear binder block is handled manually by one person, the weight of the clear binder block may vary from 1 to 20 kg, and from 20 to 50 kg when handled by two people. When the handling is done by mechanical equipment, the weight of the clear binder block may vary from 50 to 1000 kg.

The clear binder block is manufactured from the additivated clear binder composition as described above according to any industrially known process, for example by extrusion, by molding, or according to the manufacturing process described in document US2011/0290695.

According to one embodiment, the clear binder block is covered, on all or part of its surface, with a coloring agent as described above, such as for example a pigment.

According to one embodiment, the clear binder block is advantageously wrapped in a hot-melt film according to any known process, preferably by a film made of polypropylene or polyethylene or a mixture of polyethylene and polypropylene. The clear binder packaged as a clear binder block wrapped in a hot melt film has the advantage of being ready for use, that is to say that it can be directly introduced into the mixing unit for manufacturing the mixes. The hot melt material which melts with the additivated clear binder does not affect the properties of said clear binder.

According to one embodiment, the clear binder block may also be packaged in a cardboard container according to any known process.

In particular, the clear binder block is packaged in a cardboard container by hot-pouring the clear binder into a cardboard container, the wall of the inner face of which is siliconized, and then cooled, the dimensions of the cardboard container being suited to the desired weight and/or volume of the clear binder block.

When the clear binder block according to the invention is wrapped in a hot-melt film or is packaged in a cardboard container, the applicant has demonstrated that the deterioration of said hot-melt film or of said cardboard container during the transportation and/or storage under cold conditions of said clear binder block did not lead to creeping of the clear binder. Consequently, the clear binder blocks according to the invention retain their initial form and do not stick to one another during the transportation and/or storage thereof under cold conditions, even if the hot-melt film or the cardboard container is damaged. The absence of creep of the clear binder in block form during the transportation and/or storage thereof under cold conditions is due to the presence of at least one chemical additive within the clear binder.

Clear Binder Pellets

According to another embodiment of the invention, the clear binder that is solid under cold conditions is in the form of pellets.

The pellets of clear binder according to the invention can have, within one and the same population of pellets, one or more shapes chosen from a cylindrical, spherical or oval shape. More specifically, the pellets of clear binder according to the invention preferably have a cylindrical or spherical shape.

According to one embodiment of the invention, the size of the clear binder pellets is such that the longest mean dimension is preferably less than or equal to 50 mm, more preferentially from 3 to 30 mm, even more preferentially from 5 to 20 mm. For example, the use of a die makes it possible to control the manufacture of pellets of a chosen size. A sieving makes it possible to select pellets according to their size.

Preferably, the pellets of clear binder according to the invention have a weight of between 0.1 g and 50 g, preferably between 0.2 g and 10 g, more preferentially between 0.2 g and 5 g.

According to another embodiment of the invention, the size of the clear binder pellets is such that the longest average dimension is preferably less than 20 mm, more preferentially less than 10 mm, even more preferentially less than 5 mm.

The size of the clear binder pellets may vary depending on the manufacturing process employed. For example, the use of a die makes it possible to control the manufacture of pellets of a chosen size. A sieving makes it possible to select pellets according to their size.

The binder pellets are obtained by shaping additivated clear binder according to the invention as described above according to any known process, for example according to the manufacturing process described in document U.S. Pat. No. 3,026,568, document WO 2009/153324 or document WO 2012/168380. According to one particular embodiment, the shaping of the pellets can be carried out by draining, in particular using a drum.

Other techniques can be used in the process for manufacturing the clear binder pellets, in particular molding, extrusion, etc.

According to one embodiment of the invention, the clear binder pellets also comprise at least one anti-caking agent, preferably of mineral or organic origin.

According to one embodiment of the invention, the clear binder pellets also comprise at least one coloring agent as described above, such as for example a pigment.

In these embodiments, the anti-caking agent and/or the coloring agent will be chosen by those skilled in the art depending on the desired color of the clear binder.

Preferably, the clear binder pellets also comprise between 0.5% and 20% by weight, preferably between 2% and 20% by weight, more preferably between 4% and 15% by weight of the anti-caking agent relative to the total weight of additivated clear binder of said pellets.

In this embodiment, the clear binder pellets are prepared from binder as defined above, said pellets being prepared by bringing into contact:
  one or more additivated clear binders according to the invention,
  between 0.1% and 5% by weight, preferably between 0.5% and 4% by weight, more preferentially between 0.5% and 2.8% by weight, and even more preferentially between 0.5% and 2.5% by weight of at least one chemical additive chosen from an organic compound, a paraffin, a polyphosphoric acid and mixtures thereof, relative to the total weight of additivated clear binder of said pellets, and
  between 0.5% and 20% by weight, preferably between 2% and 20% by weight, more preferentially between 4% and 15% by weight of the anti-caking agent relative to the total weight of additivated clear binder of said pellets.

According to one embodiment of the invention, the clear binder pellets are covered, on at least one portion of their surface, with an anti-caking agent, preferably on the whole of their surface.

Preferably, the weight of the anti-caking agent covering at least one portion of the surface of the pellets is between 0.2% and 10% by weight, preferably between 0.5% and 8% by weight, more preferentially between 0.5% and 5% relative to the total weight of additivated clear binder of said pellets.

Advantageously, the mass of the anti-caking agent covering at least one portion of the surface of the pellets is about 1% by weight relative to the total weight of additivated clear binder of said pellets.

Preferably, the anti-caking layer covering the pellets of clear binder according to the invention is preferably continuous so that at least 90% of the surface of the clear binder pellets is covered with an anti-caking agent, preferably at least 95%, more preferentially at least 99%.

Also preferably, the average thickness of the anti-caking layer is preferably greater than or equal to 20 µm, more preferentially between 20 and 100 µm.

Advantageously, the anti-caking layer must be sufficiently thick so that it is continuous.

The pellets of clear binder according to the invention are covered with the anti-caking agent according to any known process, for example according to the process described in document U.S. Pat. No. 3,026,568.

By "anti-caking agent" or "anti-caking compound" is meant any compound which limits, reduces, inhibits, delays, the agglomeration and/or the adhesion of the pellets together during their transportation and/or their storage at ambient temperature and which ensures their fluidity during handling.

Preferably, the anti-caking agent is chosen from: talc; fines, generally less than 125 µm in diameter, with the exception of limestone fines, such as siliceous finds; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as fumed silica, functionalized fumed silica, in particular hydrophobic or hydrophilic fumed silica, pyrogenic silicas, in particular hydrophobic or hydrophilic pyrogenic silicas, silicates, silicon hydroxides and silicon oxides; plastic powder; lime; plaster; rubber powder; polymer powder, where the polymers are such as styrene/butadiene (SB) copolymers or styrene/butadiene/styrene (SBS) copolymers; and mixtures thereof.

Advantageously, the anti-caking agent is chosen from: talc; fines, generally less than 125 µm in diameter, with the exception of limestone fines, such as siliceous fines; wood residues such as lignin, lignosulfonate, conifer needle powders, conifer cone powders, in particular of pine; glass powder; sand, such as Fontainebleau sand; fumed silicas, in particular hydrophobic or hydrophilic fumed silica; pyrogenic silicas, in particular hydrophobic or hydrophilic pyrogenic silicas; and mixtures thereof.

The anti-caking compound is preferably chosen from fumed silica.

For the purposes of the invention, the "fumed silica" and "pyrogenic silica" compounds have the same chemical definition and are recorded under the same number CAS 112 945-52-5. Consequently, for the purposes of the invention, these compounds can be employed without distinction from one another.

The term "pyrogenic silica" is understood to mean either a pyrogenic silica or a pyrogenic silica derivative.

The term "pyrogenic silica" is understood to mean a compound obtained by the vapor-phase hydrolysis of chlorosilanes, such as silicon tetrachloride, in a flame of oxygen and hydrogen. Such processes are generally denoted as pyrogenic processes, the overall reaction of which is: $SiCl_4 + H_2 + O_2 \rightarrow SiO_2 + 4\ HCl$.

Pyrogenic silicas are distinguished from the other silicon dioxides in that they exhibit an amorphous structure. Of high purity (>99.8% silica), they exhibit a weak hydrophilic nature (no microporosity).

Preferably, the pyrogenic silica compound is pyrogenic silica.

According to one embodiment of the invention, the pyrogenic silica compound exhibits a specific surface of between 25 and 420 $m^2/g$, preferably between 90 and 330 $m^2/g$, more preferably between 120 and 280 $m^2/g$.

The specific surface of the pyrogenic silica, defined in $m^2/g$, commonly known as "surface area" or "SA", is measured according to the method of S. Brunauer, P. H. Emmett and I. Teller, Journal of the American Chemical Society, 60, 309 (1938) (BET).

According to one embodiment of the invention, the pyrogenic silica compound exhibits a mean particle size of between 5 and 50 nm.

According to one embodiment of the invention, the pyrogenic silica compound exhibits a pH of between 3 and 10, when it is in the aqueous phase.

According to one embodiment of the invention, the pyrogenic silica compound exhibits a carbon content of between 0.1% and 10% by weight, relative to the total weight of the pyrogenic silica compound.

According to one embodiment of the invention, the pyrogenic silica compound is chosen from a hydrophilic pyrogenic silica compound, a hydrophobic pyrogenic silica compound and mixtures thereof.

Preferably, the pyrogenic silica compound is a hydrophilic pyrogenic silica compound.

The term "hydrophilic" is understood to mean a compound which is miscible with water in all proportions.

The pyrogenic silica compound, or pyrogenic silica derivative, used within the meaning of the invention can be chemically modified.

Different types of pyrogenic silica compounds are described in the following patent applications and can be used in the present invention:

silanized pyrogenic silicas, as described in WO 2004/020532 or in WO 2007/128636, hydrophilic pyrogenic silicas, as described in WO 2009/071467 and WO 2011/000133, filed on behalf of Degussa AG or Degussa GmbH, fumed silicas rendered hydrophobic by a treatment by means of polysiloxanes, as described in WO 2008/141932, or by silanization, as described in WO 2008/141930, silicas doped with potassium oxide, as described in WO 2008/043635 and WO 2008/022836, silicas in the form of aggregates of primary particles, as described in WO 2009/015969, filed on behalf of Evonik Degussa GmbH, or in WO 2010/028261, filed on behalf of Cabot Corporation.

The fumed silica compound can be used alone or as a mixture in a coating composition.

Whether it is employed alone or as a mixture in a composition, the pyrogenic silica compound can be employed in the process according to the invention in the form of a powder or as a dispersion in a solvent which evaporates after application.

Preferably, when the coating composition comprises at least one pyrogenic silica compound and at least one solvent, the coating composition comprises from 5% to 70% by weight of pyrogenic silica compound, relative to the total weight of the composition, more preferably from 20% to 40% by weight.

Preferably, the solvent is an organic solvent or water. The term "organic solvent" is understood to mean any solvent which is immiscible with a bitumen, such as an alcohol, for example ethanol.

The pyrogenic silica compounds used in the invention are commercially available and may, for example, be sold by Evonik Degussa under the Aerosil® brand, such as, for example, Aerosil® 200, by Cabot Corporation under the Cab-O-Sil® and Cab-O-Sperse® brands or else by Wacker Chemie AG under the HDK® brand.

According to one embodiment of the invention, the anti-caking agent included in the clear binder forming the clear binder pellets may be identical to or different than the anti-caking agent covering at least one portion of the surface of said clear binder pellets.

According to one embodiment of the invention, the clear binder pellets comprise a core and a coating layer in which:
the core comprises at least one additivated clear binder as defined above, and
the coating layer comprises at least one viscosifying compound and at least one anti-caking compound as defined above.

According to one embodiment of the invention, the clear binder pellets are covered on at least one portion of their surface with a coloring agent as described above, such as, for example, a pigment, preferably on all of their surface.

The term "coating layer" means that the coating layer covers at least 90% of the surface of the core, preferably at least 95% of the surface of the core and more preferably at least 99% of the surface of the core.

The term "viscosifier" or "viscosifying compound" means a compound which has the property of decreasing the fluidity of a liquid or a composition and thus of increasing the viscosity thereof.

For the purposes of the invention, the terms "viscosifier" and "viscosifying agent" are used equivalently and independently of one another.

For the purposes of the invention, the viscosifier is a material that has a dynamic viscosity greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C. The viscosity of a viscosifier according to the invention is measured at 65° C. by means of a Brookfield CAP 2000+ viscometer and at a rotation speed of 750 rpm. The measurement is read after 30 seconds for each temperature.

Preferably, the viscosifier is chosen from:
gelling compounds preferably of plant or animal origin, such as: gelatin, agar agar, alginates, cellulose derivatives, starches, modified starches, or gellan gums;
polyethylene glycols (PEGs) such as PEGs having a molecular weight of between 800 g·mol$^{-1}$ and 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
mixtures of such compounds.

Advantageously, the viscosifier is chosen from:
gelling compounds preferably of plant or animal origin, such as: gelatin, agar agar, alginates, cellulose derivatives or gellan gums;
polyethylene glycols (PEGs) such as PEGs having a molecular weight of between 800 g·mol$^{-1}$ and 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
mixtures of such compounds.

According to one embodiment of the invention, the coating layer is obtained by applying a composition comprising at least one viscosifying compound and at least one anti-caking compound on all or part of the surface of the core of the solid clear binder.

Preferably, the coating layer is solid at ambient temperature, including at high ambient temperature.

Preferably, the composition comprising at least one viscosifying compound and at least one anti-caking compound has a viscosity greater than or equal to 200 mPa·s$^{-1}$, preferably of between 200 mPa·s$^{-1}$ and 700 mPa·s$^{-1}$, the viscosity being a Brookfield viscosity.

Preferentially, the coating layer comprises at least 10% by weight of at least one viscosifying compound relative to the total weight of the coating layer, preferably from 10% to 90% by weight, more preferentially from 10% to 85% by weight.

Advantageously, when the vicosifier is a gelling agent, such as, for example, gelatin, the coating layer comprises from 10% to 90% by weight of viscosifying compound relative to the total weight of the coating layer, preferably from 15% to 85% by weight, even better still from 15% to 60%.

Advantageously, when the vicosifier is a gelling agent, such as, for example, gelatin, the coating layer comprises from 10% to 90% by weight of anti-caking compound relative to the total weight of the coating layer, preferably from 15% to 85%, even better still from 40% to 85%.

Advantageously, when the vicosifier is a PEG, such as for example a PEG having a molecular weight between 800 g·mol$^{-1}$ and 8000 g·mol$^{-1}$, the coating layer comprises from 10% to 90% by weight of viscosifying compound relative to the total weight of the coating layer, preferably 40% to 90%, even better still from 60% to 90%.

Advantageously, when the vicosifier is a PEG, such as for example a PEG having a molecular weight of between 800 g·mol$^{-1}$ and 8000 g·mol$^{-1}$, the coating layer comprises from 10% to 90% by weight of anti-caking compound relative to the total weight of the coating layer, preferably from 10% to 60%, even better still from 10% to 40%.

Preferentially, the coating layer comprises at least 10% by weight of an anti-caking compound relative to the total weight of the coating layer, preferably from 10% to 90% by weight, even more preferentially from 15% to 90% by weight.

Preferably, the coating layer represents at least 5% by weight relative to the total weight of the pellets, preferably from 10% to 60% by weight, more preferentially from 10% to 50%.

Advantageously, the viscosifying compound and the anti-caking compound represent at least 90% by weight relative to the total weight of the coating layer, even better still at least 95% by weight and advantageously at least 98% by weight.

According to one preferred embodiment, the coating layer consists essentially of the viscosifying compound and the anti-caking compound.

In addition to the viscosifying compound and the anti-caking compound, the coating layer may optionally comprise one or more compounds chosen from: chemical additives, polymers, etc.

According to one preferred embodiment of the invention, the clear binder pellets have:
- a core comprising at least one clear binder as defined above, and
- a coating layer comprising gelatin or a PEG and at least one anti-caking compound chosen from fines, generally less than 125 μm in diameter; wood residues such as lignin, conifer needle powders and conifer cone powders; rubber crumb; SBS copolymer powder; fumed silica, in particular hydrophilic or hydrophobic fumed silica; pyrogenic silicas, in particular hydrophobic or hydrophilic pyrogenic silicas; and mixtures thereof.

More preferably, the clear binder pellets have:
- a core comprising at least one clear binder as defined above, and
- a coating layer comprising gelatin or a PEG and at least one anti-caking compound chosen from fines, generally less than 125 μm in diameter; lignin; rubber crumb; fumed silica, in particular hydrophilic or hydrophobic fumed silica; pyrogenic silicas, in particular hydrophobic or hydrophilic pyrogenic silicas; SBS copolymer powder.

According to a further preferred embodiment, the clear binder pellets essentially consist of:
- a core consisting of an additivated clear binder as defined above, and
- a coating layer consisting of a mixture of gelatin or of a PEG, with at least one anti-caking compound chosen from fines, generally less than 125 μm in diameter; lignin; rubber crumb; SBS copolymer powder; fumed silica, in particular hydrophilic or hydrophobic fumed silica; pyrogenic silicas, in particular hydrophobic or hydrophilic pyrogenic silicas.

Preferentially, the clear binder pellets essentially consist of:
- a core consisting of an additivated clear binder as defined above comprising at least one chemical additive chosen from an organic compound, a paraffin, a polyphosphoric acid and mixtures thereof, and
- a coating layer consisting of a mixture of gelatin or of a PEG, with at least one anti-caking compound chosen from fines, generally less than 125 μm in diameter; lignin; rubber crumb; SBS copolymer powder; fumed silica; pyrogenic silicas, in particular hydrophobic or hydrophilic pyrogenic silicas.

According to another further preferred embodiment, the clear binder pellets essentially consist of:
- a core consisting of an additivated clear binder as defined above, comprising a chemical additive of formula (I) defined above, and
- a coating layer consisting of a mixture of gelatin or of a PEG, with at least one anti-caking compound chosen from fines, generally less than 125 μm in diameter; lignin; rubber crumb; SBS copolymer powder; fumed silica, in particular hydrophilic or hydrophobic fumed silica; pyrogenic silicas, in particular hydrophobic or hydrophilic pyrogenic silicas.

According to another further preferred embodiment, the clear binder pellets essentially consist of:
- a core consisting of an additivated clear binder as defined above, comprising a chemical additive of formula (I) defined above, and
- a coating layer consisting of a mixture of gelatin or of a PEG, with at least one anti-caking compound chosen from fumed silica, in particular hydrophilic or hydrophobic fumed silica.

According to one embodiment of the invention, the clear binder pellets also comprise one or more other coating layers, based on anti-caking agent covering all or part of the coating layer of the clear binder that is solid under cold conditions according to the invention.

Kit of Clear Binder that is Solid Under Cold Conditions and in Divided Form

Another subject of the invention relates to a kit comprising at least:
- one clear binder that is solid under cold conditions and in divided form as defined above,
- one capsule comprising a compound chosen from at least one copolymer based on conjugated diene units and aromatic monovinyl hydrocarbon units, for example based on butadiene units and styrene units, at least one adhesion dopant, at least one coloring agent and a mixture thereof.

According to one embodiment of the invention, the clear binder that is solid under cold conditions and in divided form is in the form of blocks.

According to one embodiment of the invention, the clear binder in block form comprises, on one face thereof, a cavity making it possible to house all or part of the capsule.

According to one embodiment of the invention, the capsule is removably housed entirely or partially in the cavity.

According to this embodiment, the capsule may be a capsule with a soft casing, especially a sachet, or a capsule with a hard casing.

The capsule is preferably made of hot-melt plastic film, especially made of polyethylene, or made of silicone.

Another subject of the invention relates to the use of the kit as defined above in the process for preparing a ready-to-apply clear binder according to the invention.

According to one embodiment of the invention, the clear binder in block form and the capsule forming the kit as defined above are used simultaneously or consecutively in the process for preparing a clear binder.

In an alternative form, when the clear binder in block form and the capsule forming the kit as defined above are used consecutively in the process for preparing a clear binder, said clear binder in block form is preheated and then the capsule comprising the copolymer is added. In this alternative form, before the clear binder block is heated, the capsule is removed from the cavity present on one of the faces of the block.

In another alternative form, the clear binder in block form and the capsule forming the kit as defined above are used simultaneously in the process for preparing a clear binder.

Applications of the Clear Binder in Solid Form Under Cold Conditions and in Divided Form Another subject of the invention relates to the use of clear binder that is solid under cold conditions and in divided form as defined above for the manufacture of poured asphalt or mixes.

The clear binder can be employed for manufacturing poured asphalts or mixes, in combination with aggregates according to any known process.

In one embodiment of the invention, the mixes comprise a clear binder according to the invention, aggregates, optionally fillers and optionally pigments.

The fillers (or fines) are particles smaller than 0.063 mm. The aggregates comprise particles of sizes 0/2 (sand), 2/4 (chippings), 4/6 and 6/10.

The mix generally comprises from 1% to 10% by weight of synthetic clear binder, relative to the total weight of the mix, preferably from 4% to 8% by weight, the remainder consisting of the aggregates, optionally the fillers and optionally the pigments (the pigments representing an amount by weight of 0 to 1% of the mix, the fillers representing an amount by weight of 0 to 2% of the mix).

In another embodiment, the poured asphalts comprise a clear binder according to the invention, mineral fillers and optionally pigments. The asphalt comprises from 1% to 20% by weight of clear binder, relative to the total weight of the asphalt, preferably from 5% to 10% by weight, the remainder consisting of the fillers and optionally the pigments (the pigments representing an amount by weight of 0 to 1% of the asphalt).

Another subject of the invention relates to a process for manufacturing poured asphalts or mixes comprising at least one clear binder that is solid under cold conditions and in divided form and aggregates, the clear binder being chosen from among the clear binders according to the invention, this process comprising at least the steps of:
heating the aggregates to a temperature ranging from 100° C. to 180° C.,
mixing the aggregates with the clear binder in a vessel, such as a mixer or a drum mixer,
obtaining poured asphalts or mixes.

In one embodiment of the invention, the process does not comprise a step of heating the clear binder that is solid under cold conditions and in divided form, before mixing it with the aggregates.

The process according to the invention therefore has the advantage of being able to be implemented without a prior step of heating the clear binder that is solid under cold conditions and in divided form.

The process for manufacturing poured asphalts or mixes according to the invention does not require a step of heating the clear binder that is solid under cold conditions and in divided form before mixing with the aggregates because, on contact with the hot aggregates, the clear binder that is solid under cold conditions and in divided form melts.

The clear binder that is solid under cold conditions and in divided form as described above has the advantage of being able to be added directly to the hot aggregates, without having to be melted prior to the mixing with the hot aggregates.

Preferably, the step of mixing the aggregates and the clear binder that is solid under cold conditions and in divided form is carried out with stirring, and then the stirring is maintained for at most 5 minutes, preferably at most 1 minute, in order to make it possible to obtain a homogeneous mixture.

Moreover, during the manufacture of poured asphalts or mixes, when the clear binder is in the form of pellets composed of a coating layer, said coating layer of the pellets breaks under the effect of contact with the hot aggregates and of the shear and it releases the clear binder. Finally, the presence of the coating layer in the mixture of the clear binder and aggregates does not degrade the properties of said clear binder for the manufacture of poured asphalts or mixes, compared to a conventional clear binder, that is to say one that is not solid under cold conditions and in divided form.

Another subject of the invention relates to the use of clear binder that is solid under cold conditions and in divided form according to the invention for the manufacture of emulsion.

In one embodiment of the invention, the clear binder emulsion comprises a clear binder according to the invention, water and an emulsifying agent.

The various embodiments, alternative forms, preferences and advantages described above for each of the subject matters of the invention apply to all the subjects of the invention and can be taken separately or in combination.

The invention is illustrated by the following examples given as nonlimiting.

EXAMPLES

Materials and Methods

The clear binder bases according to the invention are prepared according to the following general process:
(i) the oil is heated, for example to 170° C.;
(ii) the resin is added, and mixing is carried out, for example, for 1 h to 2 h at 170° C. with a stirring speed of 300 rpm;
(iii) the powdered copolymer is added, and mixing is carried out, for example, for 2 h at 170° C. with a stirring speed of 300 rpm;
(iv) where appropriate, the adhesion dopant is added in liquid form and then mixing is carried out, for example, for 15 minutes at 170° C.

The rheological and mechanical characteristics of the clear binder bases according to the invention to which reference is made in these examples are measured in the way shown in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring-and-ball softening temperature | RBT | ° C. | NF EN 1427 |

The variation in the ring-and-ball softening temperature (RBT) is measured according to the NF EN 1427 standard from said composition between the sample extracted from the top part of the sample tube and the sample extracted from the bottom part of the sample tube.

Examples of $C_1$ to $C_7$ clear binder bases according to the invention are prepared according to the process described above with the constituents and in the proportions (in percentage by weight relative to the total weight of clear binder) indicated in the following table 2:

TABLE 2

| | Compositions of clear binder bases | | | | | | |
|---|---|---|---|---|---|---|---|
| | C1 | C2 | C3 | C4 | C5 | C6 | C7 |
| RAE [1] oil | 61.8% | 62.0% | — | — | — | — | — |
| DAO oil [5] | — | — | 63.8% | 63.8% | 63.8% | 61.6% | 54.3% |
| Resin [2] | 33.0% | 32.8% | 31.0% | 31.0% | 31.0% | 33.2% | 40.0% |
| SBS copolymer [3] | 5.0% | | — | — | 5.0% | 5.0% | 5.5% |
| EVA polymer | — | 2.0% | — | — | — | — | — |

TABLE 2-continued

Compositions of clear binder bases

|  | C1 | C2 | C3 | C4 | C5 | C6 | C7 |
|---|---|---|---|---|---|---|---|
| EPDM polymer | — | — | — | 5.0% | — | — | — |
| thermoplastic copolymer [4] | — | 3.0% | 5.0% | — | — | — | — |
| Dopant | 0.2% | 0.2% | 0.2% | 0.2% | 0.2% | 0.2% | 0.2% |
| Penetration (1/10 mm) | 62 | 59 | 72 | 92 | 68 | 64.4 | 27.9 |
| RBT (° C.) | 51 | 53.4 | 90.4 | 61 | 76.5 | 82.0 | 84 |

[1] RAE means "Residual Aromatic Extracts" and refers to the residues of aromatic extracts of petroleum products. The RAE oil used in examples C1 to C4 has the following composition: 31% of paraffinic compounds, 49% of naphthenic compounds, and 20% of aromatic compounds, by weight of component relative to the total weight of the oil
[2] Hydrocarbon resin obtained by polymerization of $C_9$-$C_{10}$ unsaturated aromatic hydrocarbons. Its melting point is between 135 and 145° C. according to ASTM D 3461.
[3] 70/30 Styrene/butadiene/styrene linear block copolymer comprising a content by weight of 1,2-butadiene of 28.5% based on the total weight of the monomers and a weight-average molecular weight of about 140 000 daltons polystyrene (PS) equivalent.
[4] Solution-polymerized butadiene/styrene thermoplastic copolymer of radial structure, comprising a weight content of 1,2-butadiene of 7.1% and a weight-average molecular weight of about 330 000 daltons polystyrene (PS) equivalent.
[5] DAO oil is a propane deasphalted oil characterized by a content of 67% of paraffinic compounds, 19% of naphthenic compounds, and 14% of aromatic compounds as plasticizer, by weight of component relative to the total weight of the oil.

1. Preparation of the Additivated Clear Binder Bases

The additivated clear binder base compositions $B_1$, $B_2$, $B_3$, $B_4$, $B_5$ and $B_6$ are prepared from compositions C1 and C5 prepared previously and from the following additives:
2',3-bis[(3-[3,5-di-tert-butyl-4-hydroxyphenyl]propionyl)]propionohydrazide, denoted Additive A1,
N,N-ethylene-bis-stearamide, denoted Additive A2, and
1,10-decanedioic acid, denoted Additive A3.

The amounts as weight percentage used for each additivated clear binder base are shown in table 3 below:

TABLE 3

| Additivated clear binder base | $B_1$ | $B_2$ | $B_3$ | $B_4$ | $B_5$ | $B_6$ |
|---|---|---|---|---|---|---|
| Composition C1 | 99.15% | 96.5% | 97.2% | — | — | — |
| Composition C5 | — | — | — | 99.15% | 98.5% | 96% |
| Additive A1 | 0.85% | — | 0.85% | 0.85% | — | — |
| Additive A2 | — | 3.5% | 1.95% | — | — | 2.5% |
| Additive A3 | — | — | — | — | 1.5% | 1.5% |

The additivated clear binder bases are prepared in the following manner.

The clear binder base C1 or C5 is heated at 160° C. for two hours in an oven and then the chemical additive(s) is (are) added. The whole mixture is homogenized for 1 hour at a temperature between 160° C. and 180° C. and with stirring at 300 rpm.

2. Storage Stability

Load Resistance Test for Compositions $B_1$, $B_2$, $B_3$ and $B_4$

This test is carried out in order to evaluate the load resistance of the additivated clear binder compositions B1, B2, B3 and B4 prepared previously at a temperature of 50° C. under a compressive load. This test makes it possible to predict the behavior of clear binder pellets obtained from the same additivated clear binder compositions B1, B2, B3 and B4 during their transportation and/or their storage in bulk in 10 to 30 kg bags or in 500 to 1000 kg Big Bags or in 200 kg drums. This test makes it possible in particular to predict the behavior of the pellets in terms of agglomeration.

The load resistance test is carried out using a texture analyzer marketed under the name LF Plus by the company Lloyd Instruments and equipped with a thermal enclosure.

A 25 mm diameter metal container containing the additivated clear binder composition B1, B2, B3 or B4 is placed inside the thermal enclosure set at a temperature of 50° C. for 3 hours. The piston of the texture analyzer consists of a cylinder with a diameter of 20 mm and a height of 60 mm. The cylindrical piston is initially placed in contact with the upper layer of the additivated clear binder composition B1, B2, B3 or B4. Then, the piston is depressed vertically downwards, at a constant speed of 1 mm/min over a calibrated distance of 10 mm so as to exert a compressive force on the composition B1, B2, B3 or B4 placed in the container. Software makes it possible to record the resulting force as a function of the vertical movement of the piston and to determine the resulting maximum force recorded. The results are given in table 4 below.

TABLE 4

| Composition | $B_1$ | $B_2$ | $B_3$ | $B_4$ |
|---|---|---|---|---|
| Max force (in N) | 82.4 | 1.3 | 97.7 | 174 |

The clear binder compositions B1 and B4, obtained by the addition, to a clear binder base, of a hydrazide chemical compound (Additive A1), have a high hardness.

The clear binder composition B2, obtained by the addition, to a clear binder base, of an amide chemical compound (Additive A2), has a low hardness. However, the composition B3, obtained by the addition, to a clear binder base, of an amide chemical compound (Additive A2) and a hydrazide chemical additive (Additive A1), has a high hardness.

In particular, the hardness of the composition B3 is greater than the hardness of the composition B1 and than the hardness of the composition B2. The increase in the hardness of the composition B3 thus illustrates a synergy between the two chemical additives.

Because of their high hardness, the clear binder compositions B1, B3 and B4 make it possible to obtain clear binder pellets which will be stable during storage and transportation thereof in bulk in 10 to 30 kg bags or in 500 to 1000 kg Big Bags or in 200 kg drums.

3. Preparation of Cores of Pellets of Clear Binder Composition

The cores of pellets of clear binder composition G1, G2, G3, G4, G5 and G6 are prepared respectively from the additivated clear binder compositions B1, B2, B3, B4, B5 or B6 according to one of the following protocols.

3.1 General Method for Preparing Cores of Additivated Clear Binder Composition of the Pellets The additivated clear binder composition B1, B2, B3, B4, B5 or B6 is heated at a temperature between 150 and 180° C. for two hours in an oven before being poured into a silicone mold having different holes of spherical shape so as to form the cores of pellets. After having observed the solidification of the additivated clear binder composition in the mold, the surplus is levelled off with a blade heated with a Bunsen burner. After 30 minutes, the solid additivated clear binder composition in the form of uncoated pellets is demolded and stored in a tray coated with silicone paper.

3.2 General Method for Preparing the Cores of Additivated Clear Binder Composition of the Pellets with an Industrial Process For the implementation of this method, use may be made of a device and of a process as described in great detail in patent U.S. Pat. No. 4,279,579. Various models of this device are commercially available from the company Sandvik under the trade name Rotoform.

Pellets of additivated clear binder composition may also be obtained from the additivated clear binder composition B1, B2, B3, B4, B5 or B6 poured into the reservoir of such a device and maintained at a temperature of between 130 and 270° C.

An injection nozzle or several injection nozzles make(s) possible the transfer of the additivated clear binder composition B1, B2, B3, B4, B5 or B6 into the double pelletizing drum comprising an external rotating drum, the two drums being equipped with slots, nozzles and orifices making possible the pelletizing of drops of clear binder composition through the first fixed drum and orifices having a diameter of between 2 and 10 mm of the external rotating drum. The drops of additivated clear binder composition $B_1$, $B_2$, $B_3$, $B_4$, $B_5$ or $B_6$ are deposited on the upper face of a tread, horizontal, driven by rollers.

4. General Method for Preparing Pellets of Solid Additivated Clear Binder Composition Comprising a Coating Layer Composed of at Least One Anti-Caking Compound The clear binder pellets obtained according to methods 3.1 and 3.2 are left at ambient temperature for 10 to 15 minutes. The pellets thus formed are covered on their surface with an anti-caking compound and then sieved to remove excess anti-caking compound.

The pellets G1', G2', G3', G4', G5' and G6' are prepared respectively from the pellets G1, G2, G3, G4, G5 and G6 prepared previously and according to the method described above using as anti-caking compound pyrogenic silica, commercially available under the reference Aerosil®200.

The weight percentage of the coating for the pellets G1', G2', G3', G4', G5' and G6' is approximately 1% by weight relative to the total weight of the clear binder of the pellets.

It is noted that the pellets obtained have the advantage of being easily transportable and have good storage resistance.

The invention claimed is:

1. A clear binder that is solid under cold conditions and in divided form, comprising:
   at least one clear binder base and
   from 0.1% to 5% by weight, relative to a total weight of said clear binder base, of at least one chemical additive selected from the group consisting of:
   (i) a compound of general formula (I)

Ar1-R-Ar2 (I), in which:
   Ar1 and Ar2 represent, independently of one another, a benzene nucleus or a system of condensed aromatic nuclei of 6 to 20 carbon atoms that are substituted by at least one hydroxyl group and
   R represents an optionally substituted divalent radical, a main chain of which comprises from 6 to 20 carbon atoms and at least one group selected from the group consisting of amide, ester, hydrazide, urea, carbamate, and anhydride functions,
   (ii) a compound of general formula (V):

R''—(COOH)$_z$ (V), in which R'' represents a linear or branched and saturated or unsaturated chain comprising from 4 to 68 carbon atoms and z is an integer from 2 to 4,
   (iii) a polyphosphoric acid, and
   (iv) mixtures thereof.

2. The clear binder as claimed in claim 1, comprising from 0.5% to 4% by weight of said chemical additive relative to the total weight of said clear binder base.

3. The clear binder as claimed in claim 2, comprising from 0.5% to 2.8% by weight of said chemical additive relative to the total weight of said clear binder base.

4. The clear binder as claimed in claim 3, comprising from 0.5% to 2.5% by weight of said chemical additive relative to the total weight of said clear binder base.

5. The clear binder as claimed in claim 1, wherein the chemical additive is an organic compound which has a weight-average molar mass of less than or equal to 2000 gmol$^{-1}$.

6. The clear binder as claimed in claim 1, further comprising at least one plasticizer, at least one structuring agent, and at least one copolymer.

7. The clear binder as claimed in claim 1, in the form of blocks or pellets.

8. A kit comprising at least:
   one clear binder that is solid under cold conditions and in divided form as claimed in claim 1,
   one capsule comprising a compound chosen from at least one copolymer based on conjugated diene units and aromatic monovinyl hydrocarbon units, for example based on butadiene units and styrene units, at least one adhesion dopant, at least one coloring agent and a mixture thereof.

9. The kit as claimed in claim 8, wherein the clear binder that is solid under cold conditions and in divided form is in the form of blocks.

10. The kit as claimed in claim 8, wherein the clear binder that is solid under cold conditions and in divided form comprises, on one of its faces, a cavity for housing all or part of the capsule.

11. The kit as claimed in claim 10, wherein the capsule is removably housed entirely or partially in said cavity.

12. A process for preparing a clear binder as claimed in claim 1, comprising:
- mixing the at least one clear binder base and the at least one chemical additive, to form an additivated clear binder, and
- shaping the additivated clear binder in the form of a block or pellets.

\* \* \* \* \*